US009126865B2

(12) United States Patent
Blackstock et al.

(10) Patent No.: US 9,126,865 B2
(45) Date of Patent: Sep. 8, 2015

(54) GEOPOLYMERIC STRUCTURAL BUILDING UNITS AND METHODS OF MANUFACTURE THEREOF

(76) Inventors: John McIlvenna Blackstock, Antrim (GB); James Neill, Antrim (GB); John Andrew McIntosh, Antrim (GB)

( * ) Notice: Subject to any disclaimer, the term of this patent is extended or adjusted under 35 U.S.C. 154(b) by 156 days.

(21) Appl. No.: 13/261,120

(22) PCT Filed: Jul. 6, 2010

(86) PCT No.: PCT/EP2010/059664
§ 371 (c)(1),
(2), (4) Date: Jun. 28, 2012

(87) PCT Pub. No.: WO2011/003918
PCT Pub. Date: Jan. 13, 2011

(65) Prior Publication Data
US 2012/0260594 A1    Oct. 18, 2012

(30) Foreign Application Priority Data
Jul. 6, 2009  (GB) .................................. 0911633.6

(51) Int. Cl.
C04B 28/00    (2006.01)
C04B 111/00    (2006.01)

(52) U.S. Cl.
CPC ..... *C04B 28/006* (2013.01); *C04B 2111/00206* (2013.01)

(58) Field of Classification Search
CPC .... C04B 12/005; C04B 14/044; C04B 28/006
USPC ................................................ 106/600, 692
See application file for complete search history.

(56) References Cited

U.S. PATENT DOCUMENTS

| 4,472,199 A | 9/1984 | Davidovits |
| 7,794,537 B2 * | 9/2010 | Barlet-Gouedard et al. . 106/672 |

(Continued)

FOREIGN PATENT DOCUMENTS

| DE | 102004051712 A1 | 5/2006 |
| FR | 2490626 A1 | 3/1982 |

(Continued)

OTHER PUBLICATIONS

Duxson et al., "The effect of alkali and Si/Al ratio on the development of mechanical properties of metakaolin-based geopolymers," Colloids and Surfaces A: Physiochemical Engineering Aspects, vol. 292, pp. 8-20 (2007), Elsevier.

(Continued)

*Primary Examiner* — Paul Marcantoni
(74) *Attorney, Agent, or Firm* — Baker, Donelson, Bearman, Caldwell & Berkowitz

(57) ABSTRACT

The present invention provides a geopolymeric cement formed from a precursor having a relatively high alumina content (Si:Al atomic ratio of less than or equal to 1.3:1) to form an alkaline multiphase alumino-silicate material.
The precursor comprises basaltic rock in which kaolinization is at an advanced stage, preferably Interbasaltic material found in Northern Ireland.
The present invention also provides structural units for constructing a building, the structural units being manufactured using the geopolymeric cement of the invention.
The invention also provides a process for producing a geopolymeric cement comprising a precursor having a relatively high alumina content (Si:Al atomic ratio of less than or equal to 1.3:1) to form an alkaline alumino-silicate geopolymer material for manufacturing geopolymeric structural building units having compressive strengths of greater than 3 N/mm² and preferably having compressive strengths in the range of 12-25 N/mm².

20 Claims, 18 Drawing Sheets

(56) References Cited

U.S. PATENT DOCUMENTS

| | | | |
|---|---|---|---|
| 7,846,250 B2 * | 12/2010 | Barlet-Gouedard et al. | 106/600 |
| 8,202,362 B2 * | 6/2012 | Davidovits et al. | 106/600 |
| 2007/0144407 A1 | 6/2007 | Biscan et al. | |
| 2010/0058957 A1 | 3/2010 | Boxley | |
| 2010/0154676 A1 | 6/2010 | Park et al. | |

FOREIGN PATENT DOCUMENTS

| | | |
|---|---|---|
| FR | 2659963 A1 | 9/1991 |
| FR | 2680194 A1 | 2/1993 |
| JP | 2010143774 A | 7/2010 |
| WO | WO 03/040054 A1 | 5/2003 |
| WO | WO 2004/101137 A1 | 11/2004 |
| WO | WO 2008/012438 A2 | 1/2008 |

OTHER PUBLICATIONS

Kong et al., "Comparative performance of geopolymers made with metakaolin and fly ash after exposure to elevated temperatures," Cement and Concrete Research, vol. 37, pp. 1583-1589 (2007), Elsevier.

Fletcher et al., "The composition range of aluminosilicate geopolymers," Journal of the European Ceramic Society, vol. 25, pp. 1471-1477 (2005), Elsevier.

Krivenko et al., "Directed synthesis of alkaline aluminosilicate minerals in a geocement matrix," Journal of Materials Science, vol. 42, pp. 2944-2952 (2007).

Buchwald et al., "Alkali-activated metakaolin-slag blends—performance and structure in dependence of their composition," Journal of Materials Science, vol. 42, pp. 3024-3032 (2007).

Yip et al., "Microanalysis of calcium silicate hydrate gel formed within a geopolymeric binder," Journal of Materials Science, vol. 38, pp. 3851-3860 (2003).

* cited by examiner

GEOPOLYMERIC STRUCTURAL BUILDING UNITS AND METHODS OF MANUFACTURE THEREOF

The present invention relates to structural building units manufactured from geopolymeric cement. The present invention also relates to methods of manufacture of these geopolymeric structural building units.

The present invention also relates to the geopolymeric cement and to methods of manufacture of the geopolymeric cement intended for use in construction, and particularly for use in the manufacture of the aforementioned geopolymeric structural building units.

BACKGROUND INFORMATION ON GEOPOLYMERS FROM THE GEOPOLYMER ALLIANCE AND OTHER SOURCES

Geopolymers

Geopolymers are a class of inorganic polymers formed by a polycondensation reaction achieved by alkali activation of an aluminosilicate source or feedstock in a process also known as geosynthesis. After the reaction, the hardened material produced has an amorphous three-dimensional structure that consists of $AlO_4$ and $SiO_4$ tetrahedra linked alternatively by sharing oxygens. These materials, known as poly (sialates), are formed at low temperature and as a result, can incorporate an aggregate skeleton and a reinforcing system if required, during the forming process.

Geopolymers and geopolymerization have been described by Professor Joseph Davidovits in his book entitled Geopolymer Chemistry and Applications, published by Institut Géopolymère in 2008 and in his numerous papers and patents on the subject (Ref: www.geopolymer.org). Geopolymers provide a major shift in perspective, away from the classical crystalline hydration chemistry of conventional Portland cement towards that of organic chemistry and polycondensation reactions.

Geopolymers result from a mineral polycondensation reaction achieved by alkali activation—a process also known as geosynthesis. The term poly(sialate) designates a particular type of geopolymer based on aluminosilicates. The sialate network is an amorphous three-dimensional structure that consists of $AlO_4$ and $SiO_4$ tetrahedra linked alternatively by sharing oxygens. Cations ($Na^+$, $K^+$, $Li^+$, $Ca^{2+}$ . . . ) must be present in the cavities of the poly(sialate) to balance out the negative charge of the tetravalent aluminium.

The empirical formula of a poly(sialate) is:

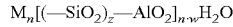
$$M_n[(-SiO_2)_z-AlO_2]_n \cdot wH_2O$$

where M is a metal cation (Na, K, Li); n is the degree of polycondensation; and z is the atomic ratio of Si:Al which may be equal to 1 to 32.

The atomic ratios of Si:Al in the poly(sialate) products play an important role in determining the physical properties and applications of the final product. It has been found that materials with a low Si:Al ratio form strong three-dimensional structures suitable for use in construction applications, while at higher ratios the product develops a more linear, two dimensional character and is suitable for use in fire resistant composites. A low Si:Al atomic ratio (1:1, 2:1 or 3:1) results in a rigid three-dimensional network. A ratio above 15:1 results in a more linear, two dimensional material. A ratio of 1:1 can be used for bricks, ceramics and fire protection applications. A 2:1 ratio is suitable for cements and concretes while a 3:1 ratio would be suited for fibreglass composites and tooling for titanium processing.

The three dimensional network poly(sialates) can be summarised as follows:

Si:Al=1:1 (i.e. 1); poly(sialate) or (M)-PS; 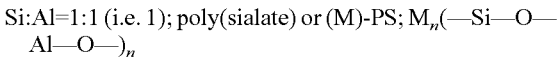$M_n(-Si-O-Al-O-)_n$

Si:Al=2:1 (i.e. 2); poly(silalate-siloxo) or (M)-PSS; 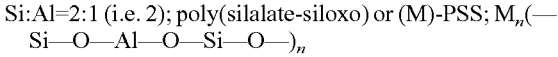$M_n(-Si-O-Al-O-Si-O-)_n$ Si:Al=3:1 (i.e. 3); poly(sialate-disiloxo) or (M)-PSDS; 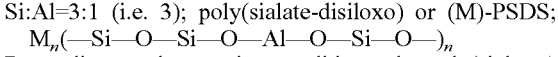$M_n(-Si-O-Si-O-Al-O-Si-O-)_n$ Depending on the reaction conditions, the poly(sialates) will form an amorphous or semi-crystalline matrix—the later are usually formed in high water, elevated temperature and low Si:Al ratio conditions and the former at ambient temperatures and lower water contents.

The properties and process of manufacture of geopolymer types poly(sialate), poly(sialate-siloxo) and poly(sialate-disiloxo) were the subject of various patents for example French patents FR 2.489.290, 2.489.291, 2.528.818, 2.621.260, 2.659.319, 2.669.918, 2.758.323 or U.S. Pat. Nos. 4,349,386, 4,472,199 and 5,342,595.

A computer molecular graphics of polymeric Mn (—Si—O—Al—O—)n poly(sialate) and Mn(—Si—O—Al—O—Si—O—)n, poly(sialate-siloxo), and related frameworks (Ref 7: Comrie) is shown in FIG. 1(d).

For the description of this invention, the term "geopolymer binder" or "geopolymer cement" relates to a mixture that sets and hardens due to polycondensation. The overall hardening process is known as the "geopolymerization" process. These reactions occur at low temperature and as a result, can incorporate an aggregate skeleton and a reinforcing system if required, during the forming process.

The Geopolymerization Process

Reactants

The reactants consist of the following parts:
1. An aluminosilicate source in the form of a fine powder (typically with a median particle in the range 1 micron to 100 microns). The precursor or feedstock needs to have a significant proportion of its silicon and aluminium held in the correct molecular orientation so as to be rendered reactive when dehydroxylated.
2. An alkali metal hydroxide/silicate solution (often referred to as the alkali activator). The most common activator is an aqueous solution of sodium hydroxide and sodium silicate but other alkali metal systems or mixtures of alkalis can be used. The purpose of the alkali silicate is three-fold: the alkali portion of the solution causes the cleavage of the aluminosilicate precursor; the silicate molecules are involved in the formation of the poly(sialate) and the solution is also the source of the metal cations for charge balancing.
3. A source of calcium such as calcium mellilite present in ground granulated blastfurnace slag to accelerate the polycondensation at room temperature.

Commonly used precursors include class F Fly Ash, weathered rock where kaolinization is far advanced, calcined clays, aluminium containing silica fume, ground granulated slags or partially calcined clays such as metakaolin, but any fine amorphous aluminosilicate material with Aluminium in IV-V fold coordination with oxygen (as determined by the MAS-NMR spectrum for $^{27}Al$) may be used.

Process

As in the case of organic polymerization, the process involves forming monomers in solution and then thermally triggering them, allowing condensation to occur between the reactive groups to form a solid polymer.

The geopolymerization process involves three separate but inter-related stages, namely dissolution, condensation and polycondensation.

1. Dissolution

During initial mixing, the alkaline solution causes the cleavage of siloxo (Si—O—Si—O) chains in the dehydroxylated aluminosilicates present in the feedstock resulting in the formation of the initial monomer necessary for forming the preliminary unit. The precursor powder is the primary feedstock but any amorphous phases present on the surface of the particles of the aggregate skeleton (stone or sand particles) will also react during this stage.

The alkali metal cations from the activating solution are necessary here in order to balance out the charge of the Aluminium in four-fold coordination with oxygen.

2. Condensation

In the solution so formed, neighbouring reactive groups such as Si—ONa and OH—Al along with small silicate molecules from the alkali silicate then undergo a condensation reaction with the liberation of alkali hydroxide to form the preliminary unit for the geopolymerization.

3. Polycondensation

The application of mild heat (typically ambient or up to 90 degrees C.) causes the preliminary units formed in step 2 to polycondense or polymerize, to form rigid chains or nets of oxygen bonded aluminate and silicate tetrahedra.

Higher "curing" temperatures produce stronger geopolymer cements. As each of the hydroxyl groups in these macromolecules are capable of condensing with one from a neighbouring molecule, it is theoretically possible for any one silicon to be bonded, via an oxygen bond, to four neighbouring silicon or aluminium sites, so forming a very rigid polymer network.

Hardened Material Produced

The resultant products are:
 a rigid chain or net of geopolymer molecules composed of at least two poly(sialate) types with different Si:Al ratios as discussed previously and
 a pore solution composed of water (from the catalytic water initially incorporated in the mix recipe plus water generated as a result of the condensation reactions), excess alkali metal cations and unreacted silicate molecules. In the case of sodium based activators this pore solution can be considered as a weak solution of sodium metasilicate, with a pH of about 12. It forms a continuous nano or meso porosity throughout the geopolymer unless removed during polycondensation.

The physical properties of the hardened geopolymer are influenced by the Si:Al ratio of the geopolymer network. Below a Si:Al ratio of 3:1, the resultant 3D nets are rigid, suitable as a concrete, cement or waste encapsulating medium. As the Si:Al ratio increases above 3, the resultant geopolymer develops a more linear, two dimensional character and becomes less rigid and more flexible. With higher Si:Al ratios, up to 35:1, the resultant cross linked 2D chains are more suited as an adhesive or sealant, or as an impregnating resin for forming fibre mat composites.

Greenhouse Gases

Wide-scale acceptance of Geopolymer Cements and the concretes they form could reduce the requirement for Ordinary Portland Cement (OPC). This represents a significant opportunity to reduce global carbon dioxide emissions a—
 given that the production of OPC requires the calcining of limestone to form the calcium components of OPC, the production of 1 tonne of OPC (by milling OPC clinker) liberates approximately 1 tonne of carbon dioxide to the atmosphere (ref: 1).
 global OPC production accounts for about 5 to 10% of worldwide $CO_2$ emissions (ref: 1).
 assuming the use of a waste binder such as fly ash and standard chemical activators, the production of 1 tonne of geopolymer cement liberates just 0.16 tonnes of $CO_2$ (ref: 1). The use of waste alkalis would clearly reduce this further.

The conclusion is that substituting geopolymer cement for OPC would reduce cement generated $CO_2$ emissions by some 80% or more. For total replacement of OPC by geopolymer cement, this potential saving represents some 4 to 8% of current world $CO_2$ emissions.

Geopolymer Composites:

The geopolymer resin for composites is also based on a poly(sialate) $M_n(Si—O—Al—O)_n$ structure whose atomic ratio of Si:Al is 3:1 or greater. These composites can be used between 200° and 1000° C. (Ref. 3).

Geopolymer Composites:

High performance fibre composites are based on a two-dimensional crosslinking network with a ratio between 20:1 and 35:1. The working temperature and curing process is dependent on the type of fibre: for E glass it is room temperature for both; for carbon it is <400° C. and room temperature up to 180° C., respectively, for steel it is <750° C. and 80 to 180° C., respectively; and for SiC it is 1000° C. and 80-1800° C., respectively. (Ref. 3).

Composites are made at room temperature or thermoset in a simple autoclave. The advantages of geopolymer composites over organic composites and other materials are: they are easy to make, as they handle easily and do not require high heat; they have a higher heat tolerance than organic composites (carbon reinforced geopolymer composites showed that they will not burn at all, no matter how many times ignition might be attempted); and mechanical properties are similar to those of organic composites. In addition, geopolymers resist all organic solvents (and are only affected by strong hydrochloric acid). (Ref. 3)

It is to be understood that geopolymeric cement is to be distinguished from hydraulic cements also known as Portland cement or Ordinary Portland Cement (OPC). Geopolymeric cements result from a mineral polycondensation reaction by alkaline activation, known as geosynthesis, as distinct from using traditional hydraulic binders in which hardening results from a hydration reaction of calcium aluminates and calcium silicates.

The atomic ratios of Si:Al in geopolymer products play an important role in determining the physical properties and applications of the final product. It is the established view in the art that geopolymer materials with a low Si:Al ratio form strong three-dimensional structures suitable for use in construction applications, while at ratios higher than 15:1, the product develops a linear, two dimensional polymeric character suitable for use in fire resistant composites.

Prior Art Publications

1. U.S. Pat. No. 7,229,491 granted to Prof. Joseph Davidovits et al, (the disclosure of which is incorporated herein by reference, discloses a geopolymeric cement or binder comprising an amorphous vitreous matrix consisting of a poly (sialate-disiloxo)-type geopolymeric compound, having approximation formula (Na, K, Ca)(—Si—O—Al—O—Si—O—Si—O) or (Na, K, Ca)-PSDS. The inventive cement consists of a mixture of different varieties of polysialates in which the atomic ratio Si:Al varies between 2 and 5.5, the average of the Si:Al atomic ratio values as measured with the electronic microprobe being close to between 2.8 and 3. The remaining components of the geopolymeric cement or binder, such as mellilite particles, aluminosilicate particles and quartz particles, are not used in said Si:Al atomic ratio calculation. The geopolymeric structure of type (K, Ca)-Poly(sialate-disiloxo) (K, Ca)-PSDS is between 50% and 60% more mechanically resistant that that of type (K, Ca)-Poly(sialate-siloxo) (K, Ca)-PSS of the prior art.

2. International Patent Publication No. WO 2008/012438 to Prof. Joseph Davidovits discloses geopolymeric cements based on aluminosilicate fly ash of class F, which, contrary to the prior art, are harmless to use and harden at ambient temperature, favouring their use in common applications in the construction and civil engineering fields. This harmlessnss is achieved thanks to a mixture containing: 10 to 15 parts by weight of a non-corrosive alkali metal silicate solution in which the $M_2O:SiO_2$ molar ratio is less than 0.78, preferably less than 0.69, and the $SiO_2:M_2O$ ratio is greater than 1.28, preferably greater than 1.45, M denoting Na or K; added to this are 10 to 20 parts by weight of water and 5 to 15 parts by weight of blast-furnace slag having specific surface area of less than 400 $m^2$/kg, preferably less than 380 $m^2$/kg and also 50 to 100 parts by weight of class F aluminosilicate fly ash.

3. U.S. Patent Publication No. US 2008/0028994 (Barlet-Gouedard et al) discloses geopolymeric compositions, which have controllable thickening and setting times for a wide range of temperatures and a large range of geopolymer slurry densities. The geopolymer slurry compositions have good mixability and pumpability, whilst the set materials develop good compressive strength and permeability. The invention discloses a method for preparing geopolymer for oilfield cementing applications. The geopolymeric compositions according to the invention comprises a suspension comprising an aluminosilicate source, a metal silicate, an alkali activator, lightweight or heavyweight fillers and a carrier fluid wherein the suspension of said geopolymeric composition is pumped in a well and allowed to set.

The geopolymeric compositions disclosed in US 2008/0028994 are preferably poly(silate), poly(sialate-siloxo) or poly(sialate-disiloxo). More preferably, the geopolymeric composition are poly(sialate-siloxo) components and therefore the silicon to aluminium atomic ratio is substantially equal to two, between 1.8 and 2.2.

This is a pumpable composition for use in the oilfield industry having a particular rheology [see column 2, paragraph [009] of US 2008/0028994].

4. U.S. Pat. No. 6,869,473 discloses cementicious materials including stainless slag and geopolymer can be added to conventional cement compositions, such as Portland cement, as a partial or total replacement for conventional cement materials. The stainless steel slag may comprise silicates and/or oxides of calcium, silicon, magnesium, iron, aluminium, manganese, titanium, sulphur, chromium and/or nickel. The geopolymer may comprise aluminium silicate and/or magnesium silicate.

The present invention does not involve inclusion of any conventional cement compositions, such as Portland cement in the geopolymer composition.

5. German Patent Publication No. DE 19535390 discloses that outer walls, inner walls, floor ceiling or roofs are constructed from bar-shaped building members of concrete or a geopolymer foam material. In cross-section, the members have the shape of an equilateral triangles and they are joined together with U-shaped recesses in the basal surfaces of the concrete members. The recesses can be filled with an appropriate material, such as thermal insulation. Members are joined with an adhesive, which is one of the materials of at least one building member.

Geopolymer Cement
Prior Art

There are a number of geopolymeric cements of the prior art (WO 92/04298, WO 92/04299, WO 95/13995, WO 98/31644, U.S. Pat. No. 4,509,985) which are the result of a polycondensation between an aluminosilicate, potassium or sodium disilicate and calcium disilicate. When potassium disilicate is used the obtained geopolymer is of the type (K, Ca)-poly(sialate-siloxo).

There are also geopolymeric cements of the prior art (WO 03/099738) which are the result of hardening of a mixture of a calcined strongly weathered granitic type rock in which kaolinisation is far advanced, calcium mellilite glass and a soluble alkaline silicate.

The prior art relating to the manufacture of a geopolymer cement has focused on the use of pure metakaolin or calcined weathered granitic type rock with an Si:Al atomic ratio of no less than 1:1. Further, there has been research carried out which found that precursors with a high alumina content would result in a low compressive strength material with little geopolymeric properties. (Ref: *The composition range of aluminosilicate geopolymers*. Ross A. Fletcher, Kenneth J. D. MacKenzie, Catherine L. Nicholson and Shiro Shimada).

The present invention seeks to alleviate the disadvantages associated with the prior art. In particular, the present invention provides a geopolymer cement produced from a precursor material having a relatively high alumina content which surprisingly, in accordance with the present invention, produces structural building units having relatively high compressive strength.

The present invention uses aluminosilicate geopolymer technologies in novel ways. These aluminosilicate geopolymers are synthesised at low temperatures from a variety of mineral and or organic precursors and an alkali reagent.

SUMMARY OF THE PRESENT INVENTION

Structural Building Units

Conventional houses and other buildings constructed using blocks/units made from conventional Portland cement, generally have an inner leaf and an outer leaf wall structure, tied together with wall ties, providing a cavity between the inner leaf and the outer leaf. The cavity wall must be insulated which is usually achieved by installing environmentally damaging insulation, either blown or as a board. This construction method is fraught with disadvantages including the potential for thermal bridging and formation of uninsulated air pockets. This type of construction is limited by the width of the cavity and eventually, achieving better thermal insulation (i.e. as measured by better U valves) become dependent on increasing the thickness of the inner leaf or applying insulation to the outer or inner leaves. To combat the cavity issue, timber frame construction, SIPs (Structural Insulated Panels) and ICF (Insulated Concrete Formwork) are being used currently, allowing greater insulation thicknesses to be achieved. These methods are fraught with difficulties such as differential movement, cracking, potential water ingress, durability issues and lack of solidity and fire resistance. All the above methods are also labour intensive.

Traditional roof construction consists of trusses, purlins and rafters or truss rafters. These are then insulated by various means. These types of construction have issues such as durability, lack of fire resistance and the insulation used is usually not of a sustainable nature. The traditional roof voids created are normally spatially inefficient.

Furthermore, conventional houses and other buildings require a layer of damp proof course (DPC) which is a sheet of plastic material laid down between the conventional Portland concrete foundations of the building and the lowermost (or first) layer of concrete blocks. This is undesirable as it creates a plastic layer which is prone to tearing and undesirable from a structural view point.

In addition to this, the prior art in manufacture of a geopolymeric cement has concentrated on the use of pure metakaolin or calcined weathered granitic type rock with an Si:Al atomic ratio of no less than 1:1. Research has been carried out which found that precursors with a high alumina content would result in a low compressive strength material with little geopolymeric properties (Ref: The composition range of aluminosilicate geopolymers. Ross A. Fletcher, Kenneth J. D. MacKenzie, Catherine L. Nicholson and Shiro Shimada) It should be noted that in the geopolymer art, $SiO_2$: $Al_2O_3$ molar ratios are referred to as well as Si:Al atomic ratios. Throughout this specification Si:Al atomic ratios are used (not $SiO_2$:$Al_2O_3$ molar ratios).

The present invention seeks to alleviate the disadvantages of the prior art.

Surprisingly, the applicants have achieved a geopolymeric cement produced from a precursor with a relatively high alumina content.

The present invention utilises a weathered basaltic type rock with a relatively high alumina content to form an alkaline alumino-silicate geopolymer cement material. Throughout this specification, by "relatively high alumina content", we mean having a Si:Al atomic ratio of less than or equal to 1.3:1.

Furthermore, the present invention provides structural units for constructing a building, the structural units being manufactured using the geopolymeric cement of the present invention. The structural units may comprise any one or more of the following: a roof structural unit, a wall structural unit, a floor structural unit, an eaves unit and/or a beam unit.

The present invention has the advantage that it provides an integral insulation section thus enabling a construction to be built without the need for a double leaf (i.e. inner leaf and outer leaf) construction and without the need for cavity wall.

The present invention also provides the main elements of a kit for constructing a building, such as a dwelling or a commercial premises, the kit mainly comprising a roof structural unit, a wall structural unit, a floor structural unit, an eaves unit and/or a beam unit, each being made from geopolymer material.

The structural building units of the present invention comprise aluminosilicate geopolymers and do not include any Portland cement-binders. Nevertheless, the structural building units of the present invention provide the structural strength and the glue to encapsulate various fillers, both functional and decorative, to form the structural building units of the present invention.

In comparison to traditional cementitious systems, the production of aluminosilicate geopolymers involves greatly reduced release of carbon dioxide during production. The building system provided by the various structural building units of the present invention will also provide lifelong reductions in energy use since the present structural building units are designed to maximise the thermal performance of the building.

For the present invention the principal precursor include weathered basaltic-type rock sourced from the Interbasaltic formation in Northern Ireland, having a relatively high alumina content (Si:Al atomic ratio of less than or equal to 1.3:1) and in which kaolinization is far advanced (e.g., lithomarge and particularly lithomage found in Co. Antrim, Northern Ireland). This precursor is firstly calcined at 650° C. to 950° C. at a temperature in the range between 650°-950° C. Other possible precursors include a number of volcanic tuffs, Silica Fumes, ash from high silica organic matter (e.g., rice husk), Calcined Mine Tailings and Diatomaceous Earth—all ground to a fine powder with a maximum particle size of less than 250 microns or more preferably a smaller maximum particle size of 150 microns. Any one or combination of these materials may be employed in combination with the principal precursor.

The weathered basaltic rock is composed of between 20% to 80% w/w of kaolinite with the remaining 80% to 20% w/w made up of smectites (e.g., montmorillionite and vermiculite), iron oxides, gibbsite and olivine residual materials.

In accordance with the present invention, these precursors are reacted in an alkali environment comprising of a soluble alkali silicate solution (preferably, Potassium Silicate solution) having a pH in the range of between 10.9 and 13.5 and with a $SiO_2$:$(Na, K)_2O$ molar ratio of between 1.25 and 1.85 or more preferably between 1.45 and 1.65. A small amount of added water is required to improve the workability of the cement.

Another component of the geopolymeric cement (i.e. geopolymeric binder) of the present invention comprises a glassy calcium silicate material such as Ground Granulated Blastfurnace Slag (GGBS) used as a source of calcium and which facilitates a reduction in setting time and an increase in early compressive strength. The term "early compressive strength" refers to the compressive strength of the structural unit in the first four (4) hours after formation from the geopolymeric composition of the present invention.

This reactive mixture comprising the precursor, alkali silicate and the calcium silicate material forms the geopolymeric cement of the present invention.

The ratio of precursor to alkali silicate, preferably Potassium Silicate, is typically between 1:0.4 and 1:2 w/w. The calcium silicate glass material is typically included in an amount of from 0-50% w/w of the total binder composition.

If there is no Ground Granulated Blastfurnace Slag (GGBS) component included, the material will still achieve the same strength by 28 days, but could take 24 hrs to commence hardening—should that be required. The preferred GGBS content is 5-9% (w/w) of the total geopolymer cement.

The GGBS has the following chemical composition: $SiO_2$—34.94%; $Al_2O_3$—13%; $Fe_2O_3$—0.37%; CaO—41.42%; MgO—8%; MnO—0.43%; $TiO_2$—0.57%.

The present invention accordingly, provides a geopolymeric cement formed from a precursor having a relatively high alumina content (i.e. Si:Al atomic ratio of less than or equal to 1.3:1) to form an alkaline alumino-silicate material.

Ideally, the geopolymer cement is formed from a precursor having a Si:Al atomic ratio in the range of between 0.5:1 and 1.3:1 and forming an alkaline alumino-silicate geopolymer cement having a relatively high compressive strength of between 95 and 120 $N/mm^2$. This geopolymer cement can be mixed with aggregates and/or fillers to form a geopolymer concrete for the manufacture of the structural building units of the present invention.

The precursor preferably has an Si:Al atomic ratio in the range of between 1:1 and 1.3:1; and more preferably, the Si:Al atomic ratio of the precursor is in the range of between 1:1 and 1.2:1; and most preferably, the Si:Al atomic ratio of the precursor is in the range of 1.05:1 and 1.2:1.

Preferably, the precursor comprises basaltic rock having relatively high alumina content.

The precursor may comprise weathered basaltic rock in which kaolinization is at an advanced stage, preferably Interbasaltic material from Northern Ireland and most preferably, Interbasaltic material known as Lithomarge found in Northern Ireland.

The precursor may have a maximum particle size of less than 250 microns and preferably less than 150 microns.

Ideally, the weathered basaltic rock is composed of between 20% to 80% w/w of kaolinite with the remaining 80% to 20% w/w made up of smectites (e.g., montmorillionite and vermiculite), iron oxides, gibbsite and olivine residual materials.

The geopolymeric cement is also formed using a calcium silicate material.

Preferably, the calcium silicate material comprises Ground Granulated Blastfurnace Slag (GGBS) which provides a source of calcium which functions as an accelerator in the setting process.

Advantageously, after setting, the geopolymeric cement has a compressive strength in the range of between 95 to 120 $N/mm^2$.

In another aspect, the present invention also provides structural units for constructing a building, the structural units being manufactured from a geopolymeric cement referred to above.

Advantageously, the structural units of the invention are formed from a geopolymer concrete comprising the geopolymer cement of the present invention and the structural units have a compressive strength in the range of 3 to 25 $N/mm^2$, more preferably in the range of 10 to 25 $N/mm^2$ and most preferably in the range of 12 to 25 $N/mm^2$.

Further advantageously, the structural units of the invention have a U-value of 0.16 $W/m^2K$ or less.

The structural unit may be in the form of any one or more of the following: a roof structural unit, a wall structural unit, a floor structural unit, an eaves unit and a beam unit.

Conveniently, the structural unit may include a plurality of air gaps, located in pre-determined arrangement such that the effective distance which heat has to travel through the unit is longer than in a unit without the air gaps, thereby increasing the insulation value of the structural unit.

In a further aspect, the present invention provides a process for producing a geopolymeric cement comprising a precursor having a relatively high alumina content (Si:Al atomic ratio of less than or equal to 1.3:1) to form an alkaline aluminosilicate material.

In the process, the precursor preferably comprises weathered basaltic rock having high alumina content and most preferably, comprises basaltic rock in which kaolinization is at an advanced stage, preferably lithomarge.

The precursor is preferably calcined at a temperature in the range of between 650° C. to 950° C.

The weathered basaltic rock is preferably composed of between 20% to 80% w/w of kaolinite with the remaining 80% to 20% w/w made up of smectites (e.g., montmorillionite and vermiculite), iron oxides, gibbsite and olivine residual materials.

In the process, the ratio of precursor to alkali silicate is preferably between 1:0.4 and 1:2 (w/w) and the calcium silicate glass material is included in an amount of between 0 to 50% w/w of the total binder composition.

In a further aspect, the present invention also provides kit for constructing a building such as a dwelling house or a commercial premises, the kit comprising a roof structural unit, a wall structural unit, a floor structural unit, an eaves structural unit and/or a beam unit, each unit being made from geopolymer cement described herein or each unit being made by the process as described herein.

The process for producing the geopolmers of the present invention (geosynthesis) takes place at low temperature (normally below 100 degrees Celsius) and a general description of the process is as follows:

General Description of the Process of the Present Invention

The dry powder components (i.e. the calcined precursor and the Ground Granulated Blastfurnace Slag (GGBS)) are blended and then mixed with the liquid component (the potassium silicate and water). The paste obtained is subjected to high shear mixing forces for up to five minutes when a very fluid geopolymer cement is obtained. Further fillers and aggregates are then mixed into this paste as required until all the particles are well coated and mixed with the cement. The resulting material is then cast into the relevant mould to cure. Preferably, the mould should be sealed to prevent the loss of water during the curing process. The curing is temperature dependant and will progress at a different rate depending on the GGBS content and the ambient temperature. Using the preferred GGBS content and at a temperature of 20° C., the material can be removed from the moulds from 2 hours onwards.

Once removed from the moulds, the formed structural building units of the invention must be stored in a moist environment for at least 7 days at 20° C. Curing may be accelerated by curing at 60° C. for at least 18 hours in a sealed environment to prevent moisture loss. The material may then be allowed to dry.

Depending on the nature of the geopolymer concrete to be formed, a variety of fillers and aggregates can be added to the geopolymeric cement (i.e. geopolymeric binder) to form the geopolymer concrete. These fillers are selected for their functional and/or decorative properties.

To achieve the thermal properties required, a variety of natural and manufactured fillers can be used. These include Pumice, Vermiculite, Perlite, expanded glass, expanded clay and metaspheres. It may also be possible to use wood and plant products, expanded plastics or aerogels. The thermal performance can also be enhanced by foaming the binder. This can be achieved by using Hydrogen Peroxide or other compound which decomposes at low temperatures, releasing a gas during the early stages of synthesis to form a foam that remains stable until setting occurs. One such compound is Sodium Perborate. It is also possible to use preformed foam, created by a foam generator and a proprietary foaming solution, which is then mixed with the binder forming a closed cell structure.

A combination of lightweight fillers and foaming can be used to optimise the thermal performance of the building units.

Advantageously, in some embodiments of the structural building units of the present invention, different densities are used across the structural building unit to optimise thermal and structural performance.

Conveniently, where a decorative veneer is required to the face of the structural building units, crushed rock filler (granite, sandstone, limestone, marble etc.) is used, bound by a suitable geopolymer cement, to reconstruct the desired finish.

Where necessary, structural performance of the beams, roof and floor units can be enhanced by wrapping a lightweight geopolymer form in an organic resin fibre composite or a geopolymer natural fibre composite. In this application, selected precursors are reacted in the reagent and reinforced with a fibre matrix. These fibres can comprise carbon fibres, glass fibres, Silicon Carbide, natural fibres or a number of organic fibres such as polypropylene. This consists of impregnating layers of fibres with either an organic resin or a suitable geopolymer resin. The number of layers and the direction of the fibres are selected to achieve the desired performance.

Advantageously, in use, the structural building units are adhered together using a geopolymer resin to ensure thermal bridging is eliminated. The adherence is achieved using an ultra-thin bonding layer of geopolymeric material.

The present invention will now be described more particularly, by way of example only, in the following Examples and with reference to a number of embodiments of the invention shown in the accompanying drawings.

Figure 1:
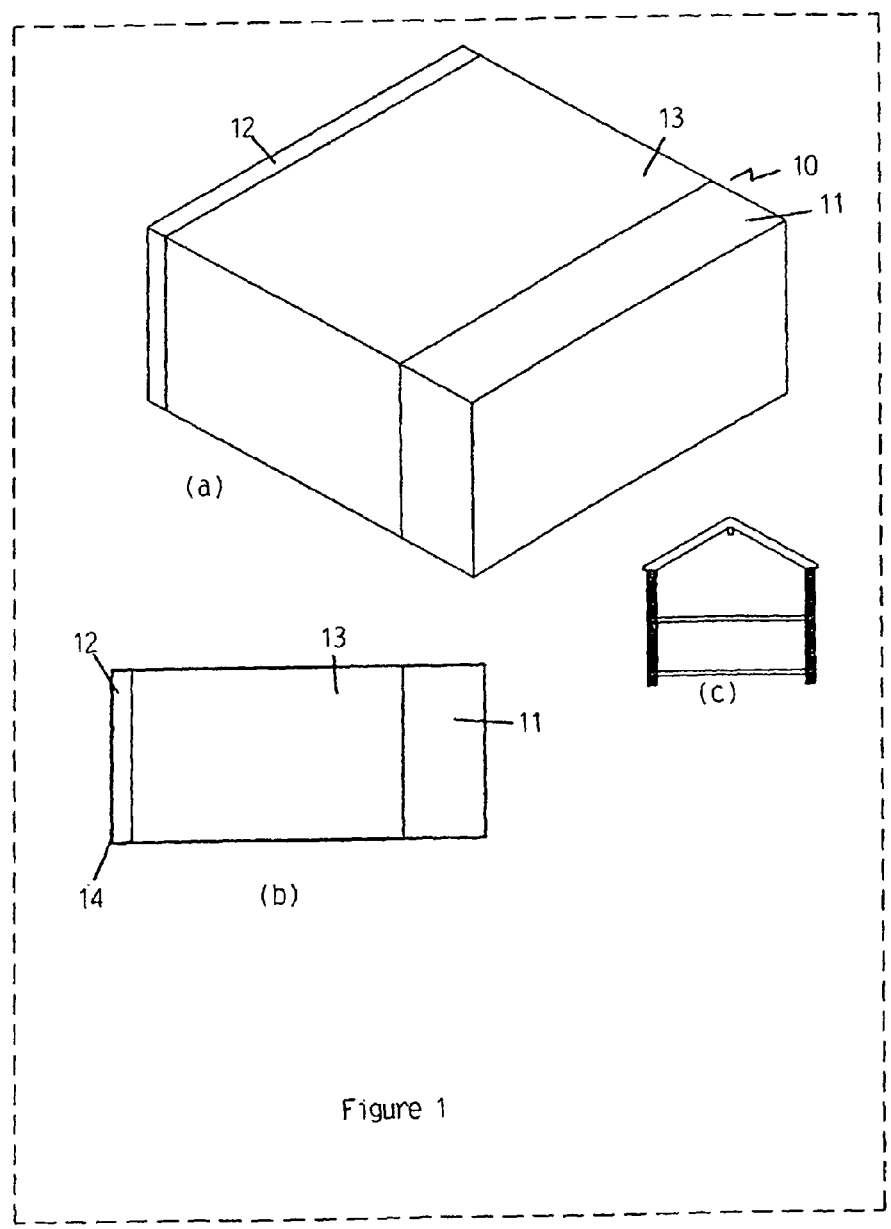
FIG. 1(a) is an isometric view of a first embodiment of a geopolymer structural building unit of the present invention for building a wall (a wall building unit)
FIG. 1(b) is a sectional view of the wall building unit of FIG. 1(a)
Figure 1D:
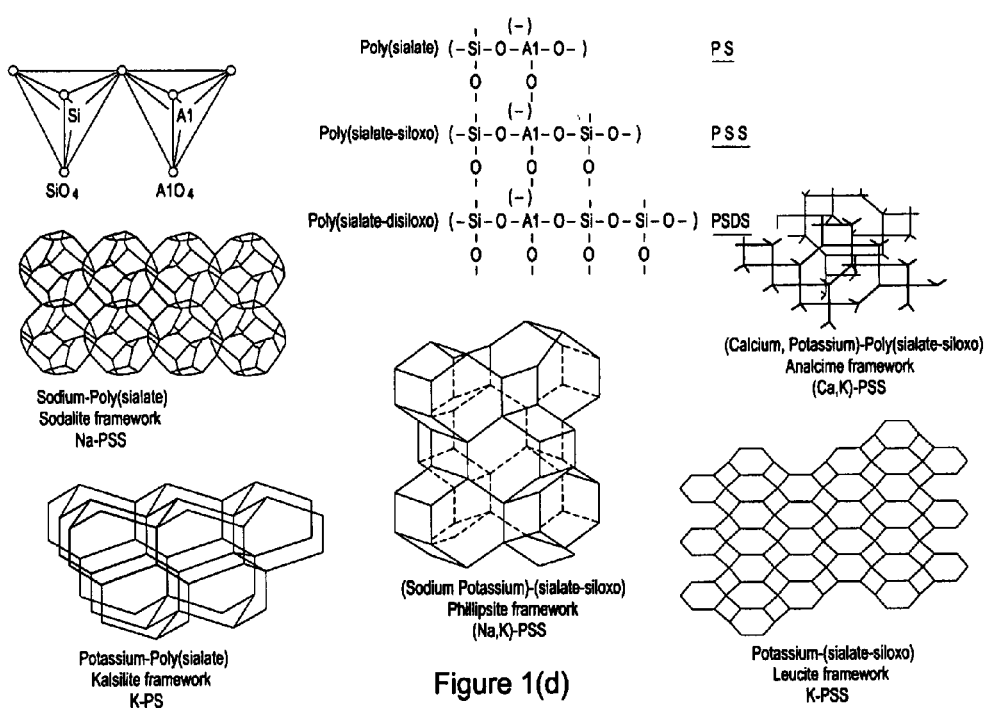

and FIG. 1(c) is a schematic sectional view through a building such as a house, showing the location of the wall building unit of Figs.1(a) and 1(b) (location of unit(s) shown in shading);

FIG. 1(d) shows a computer molecular graphics of polymeric Mn (—Si—O—Al—O—)n, poly (sialate) and Mn (—Si—O—Al—O—Si—O—)n, poly (sialate-siloxo), and related frameworks (Ref 7: Comrie).

Figure 4:
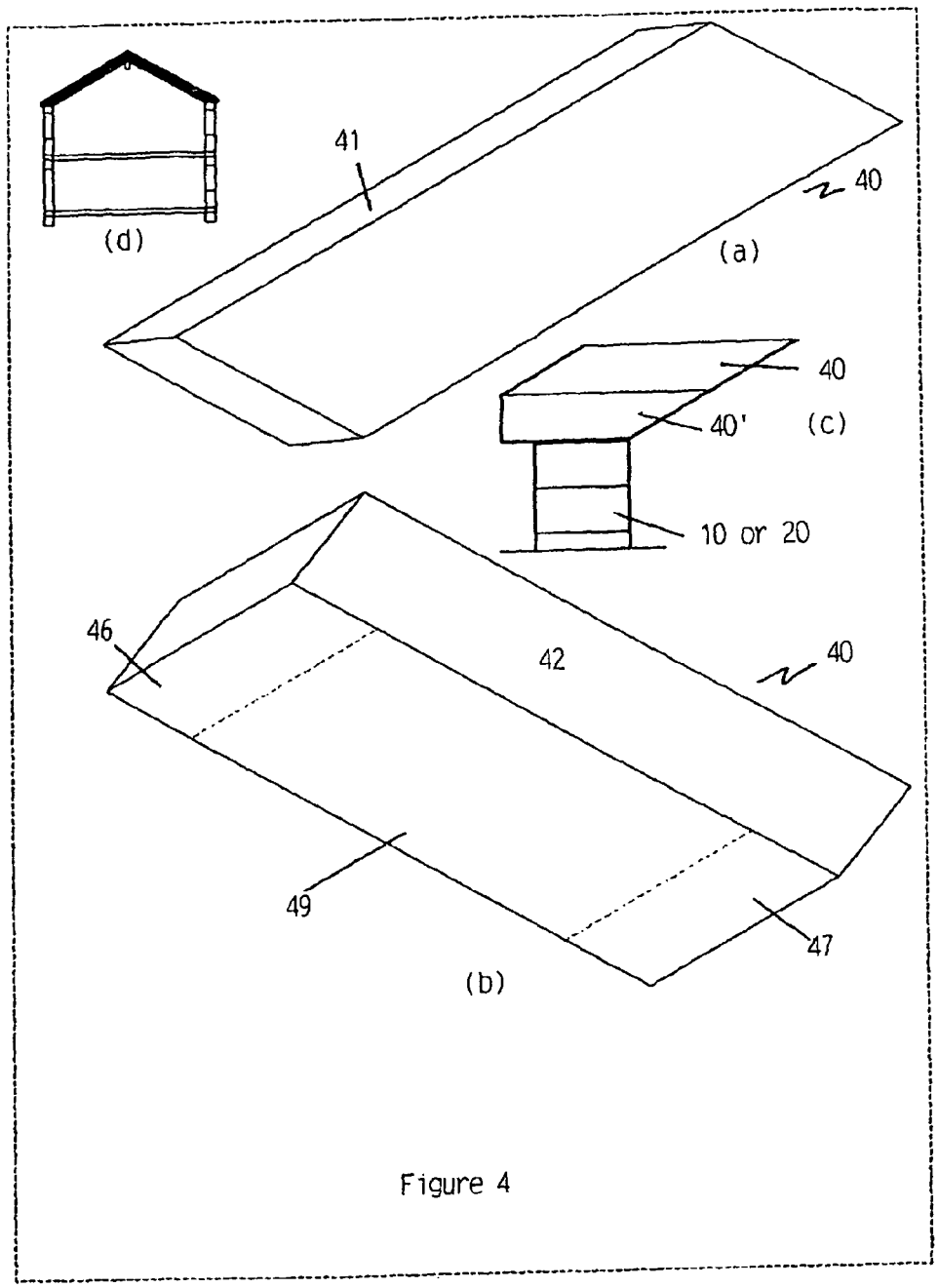
Figure 5:
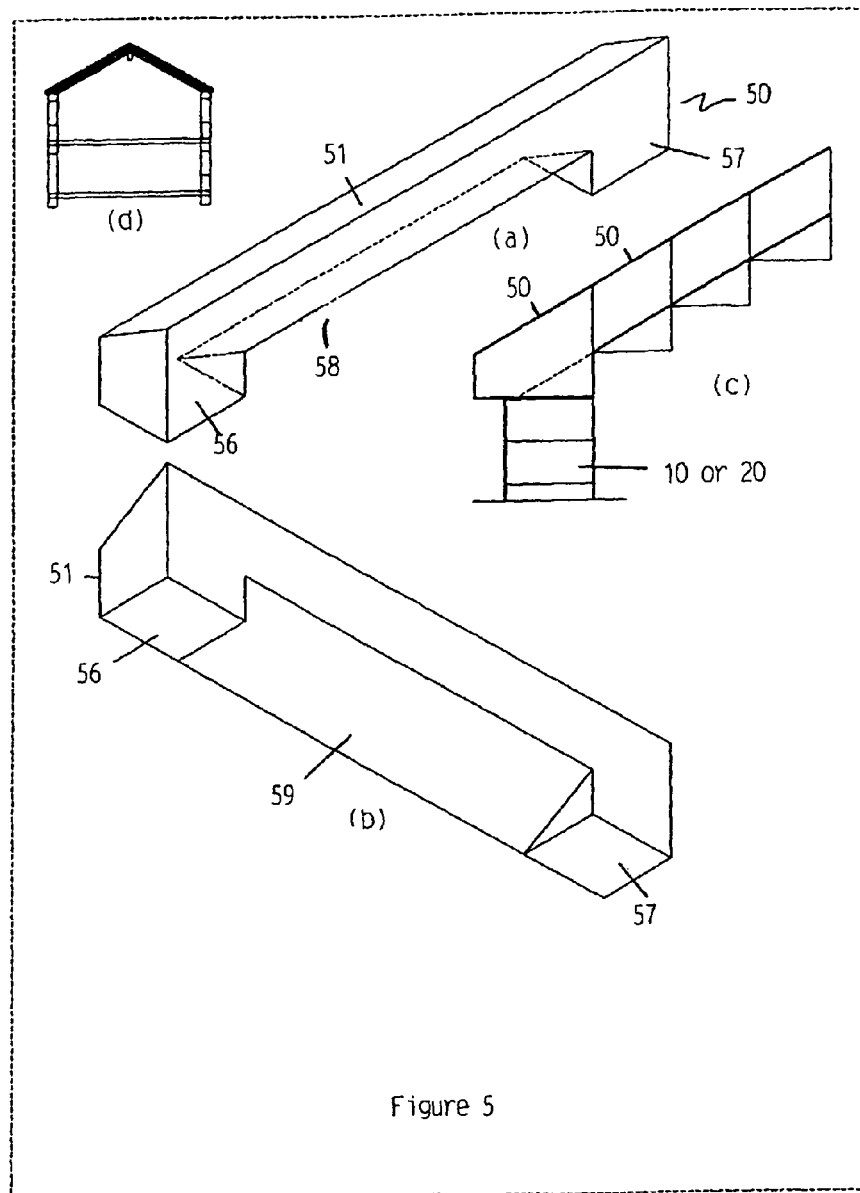
Figure 6:
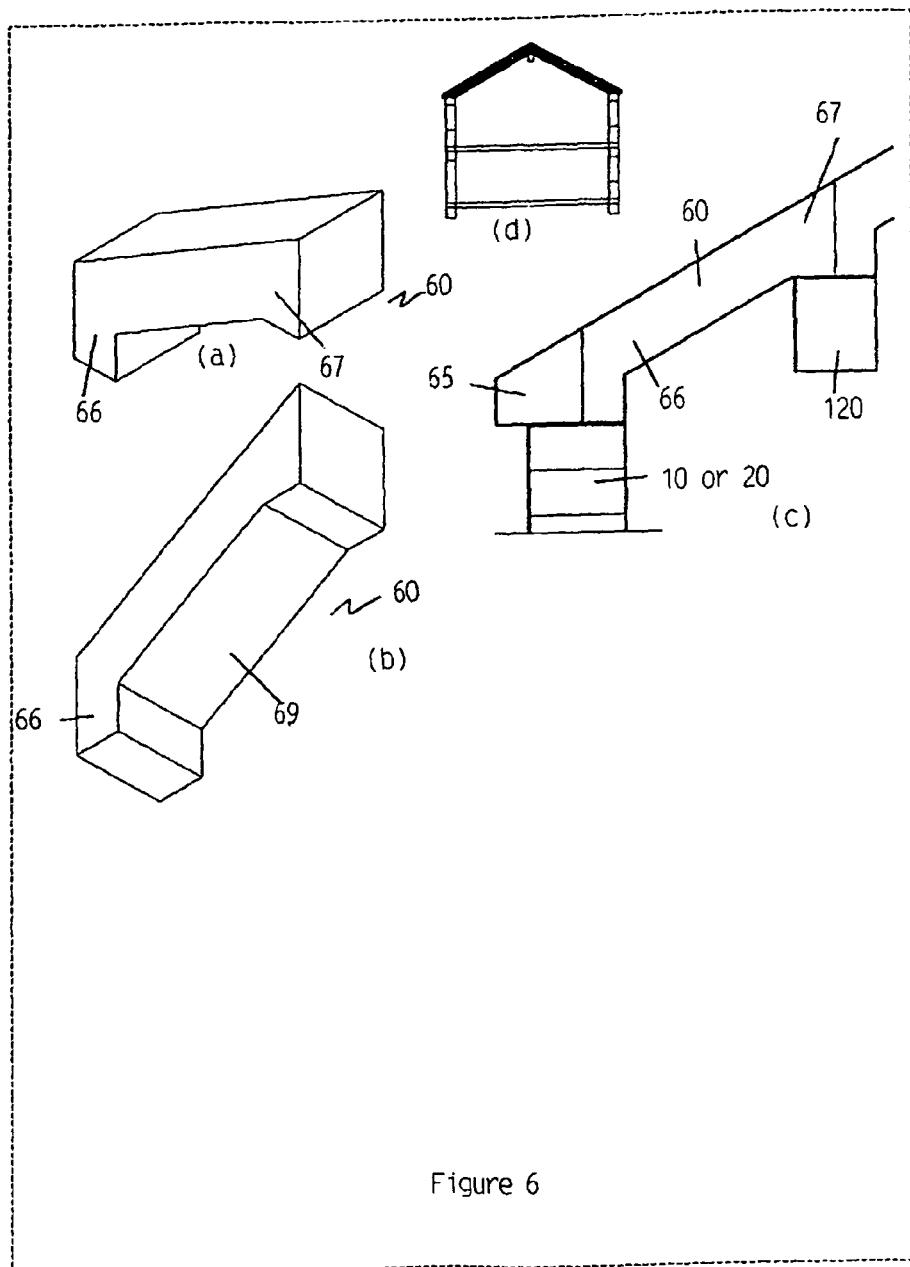
Figure 7:
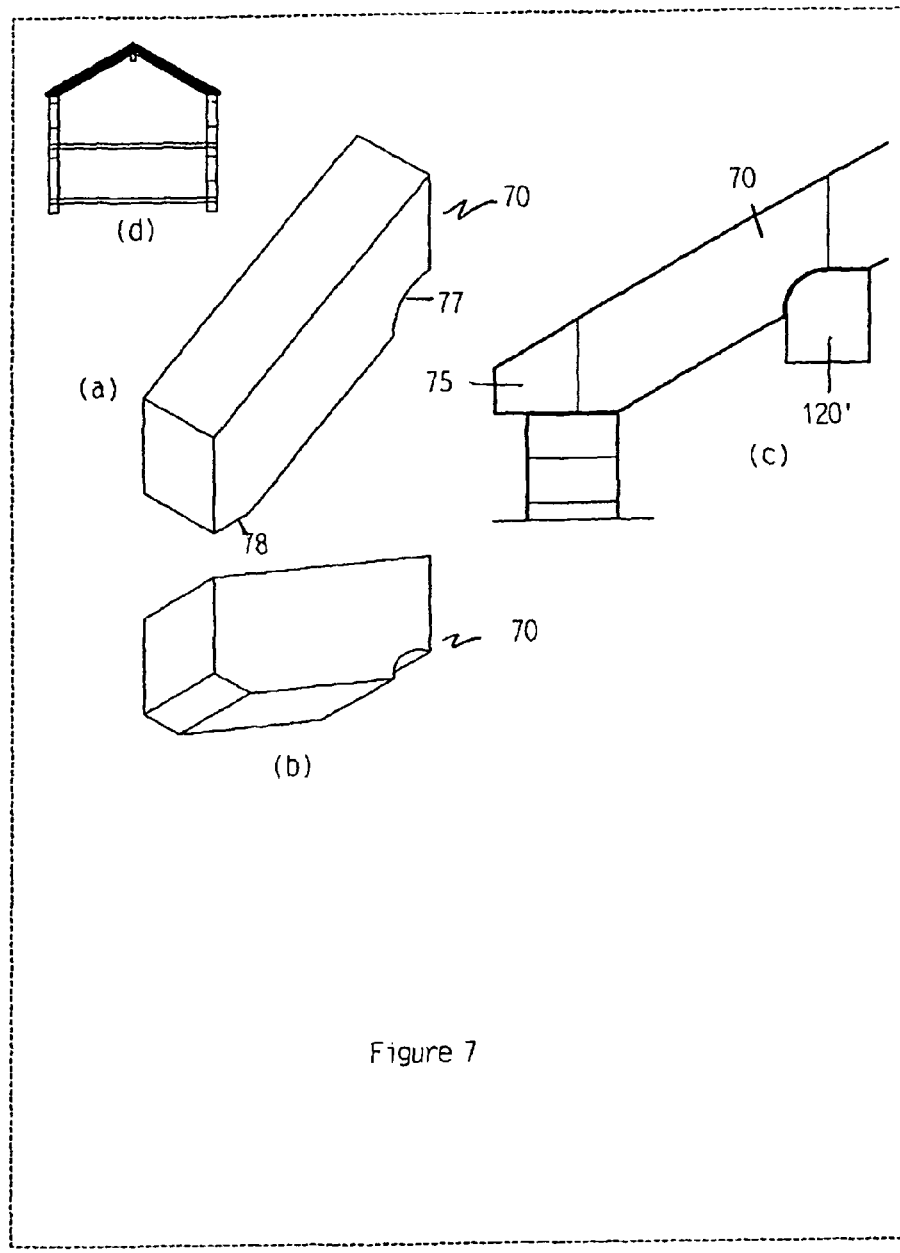
Figure 8:
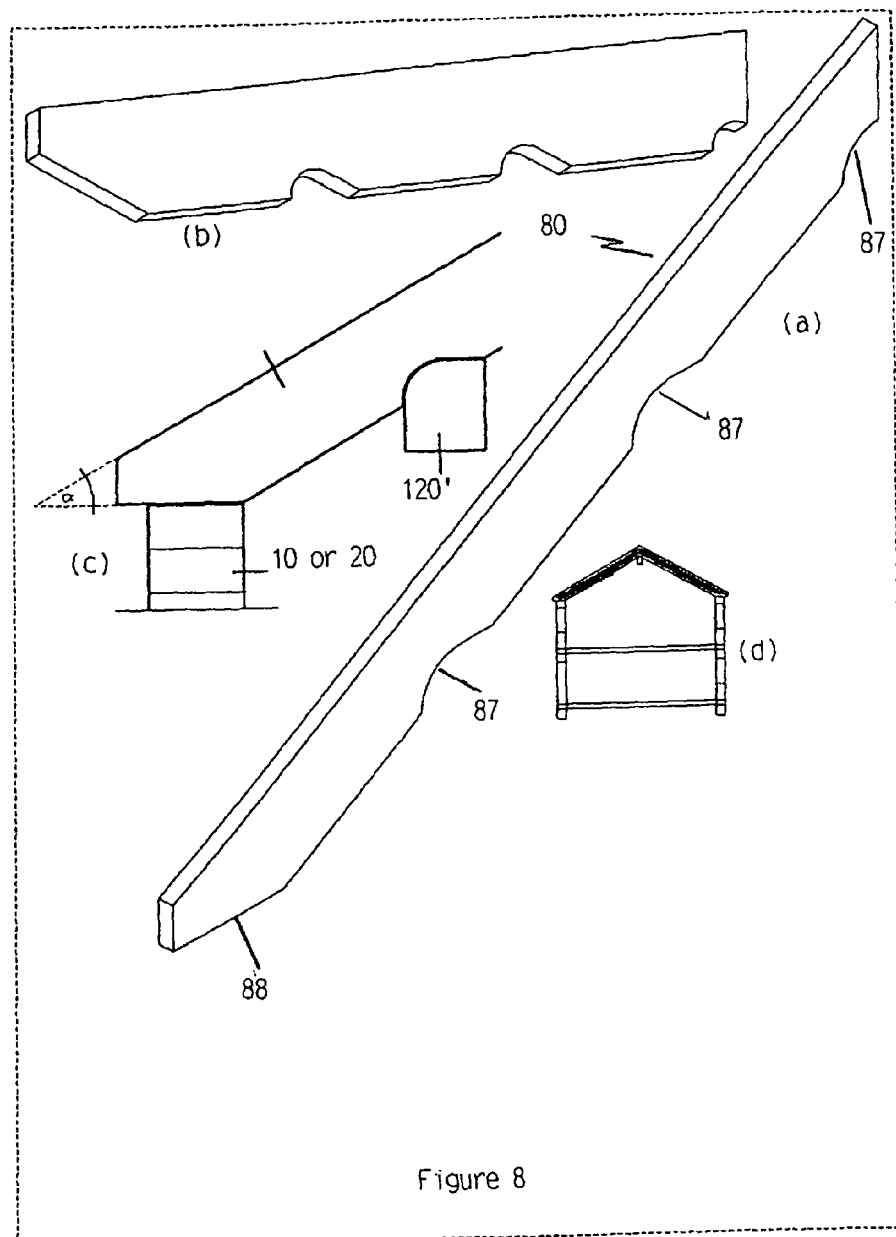
Figure 9:
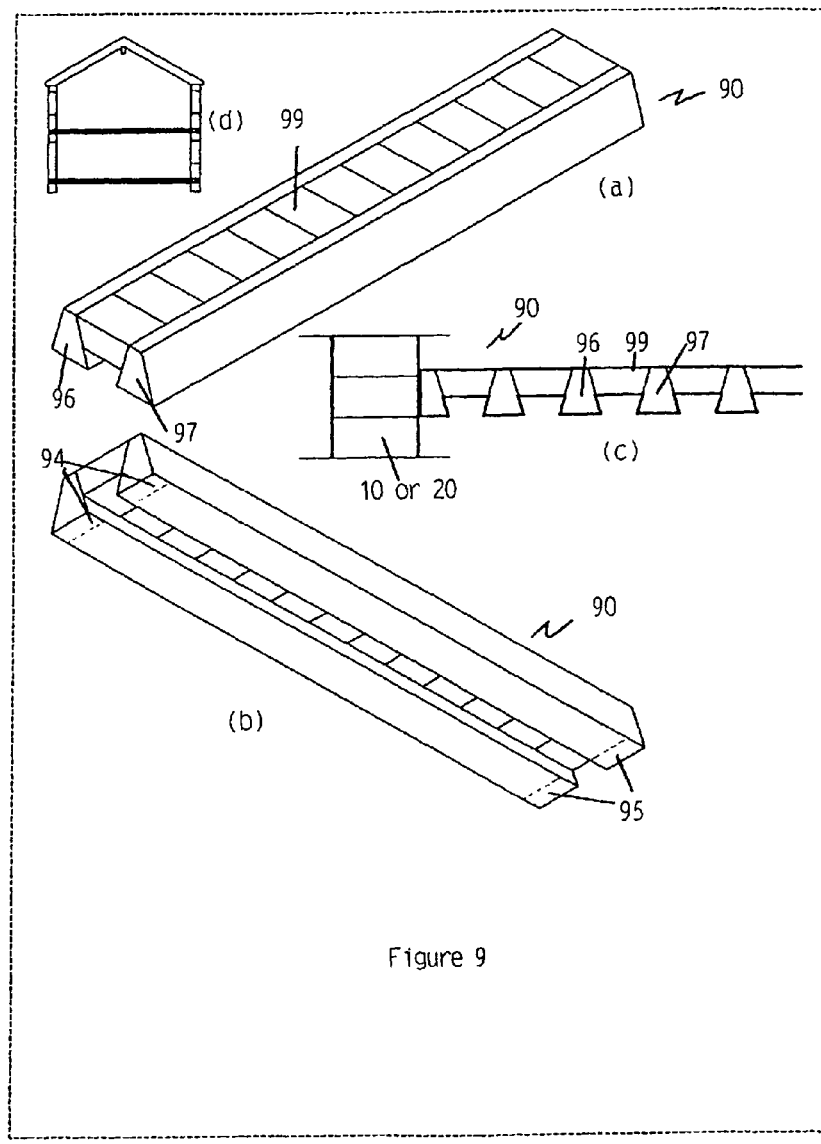
Figure 10:
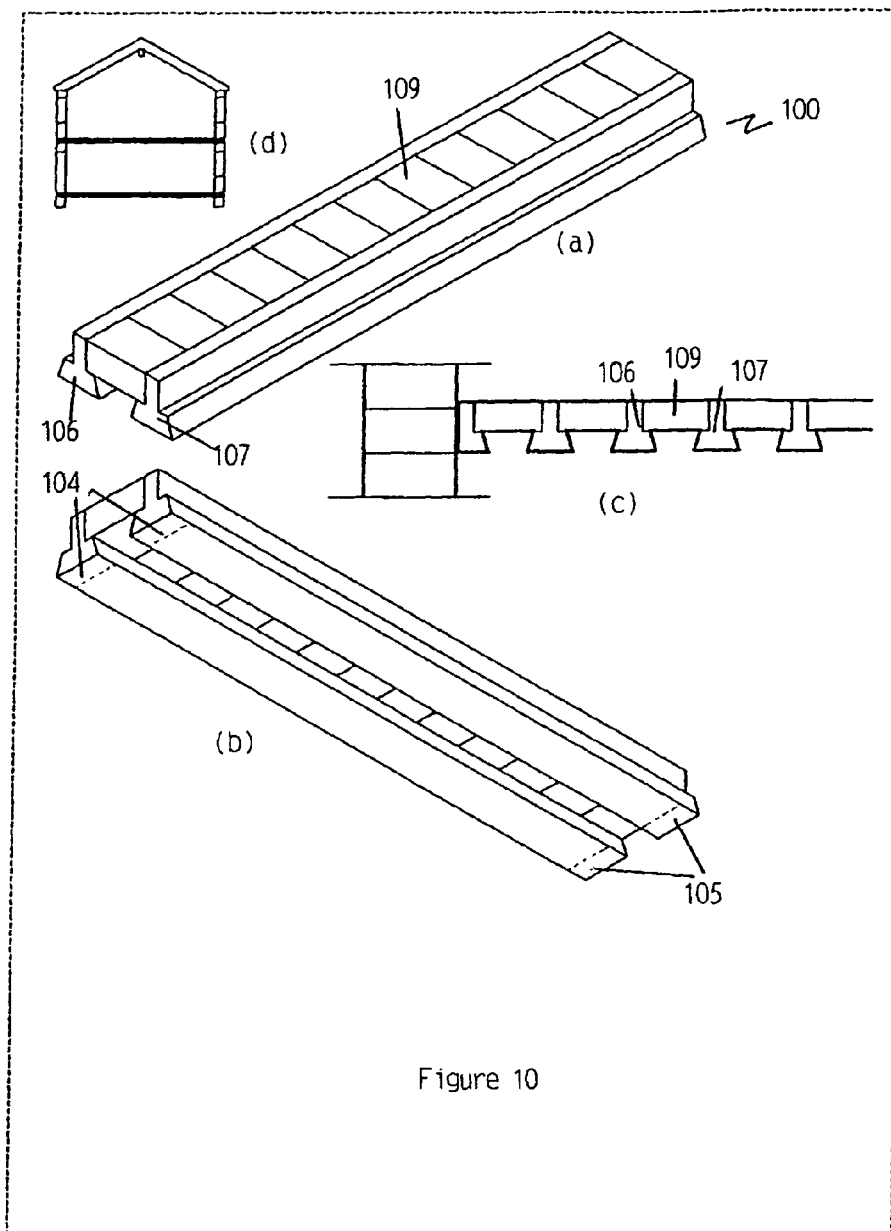
Figure 11:
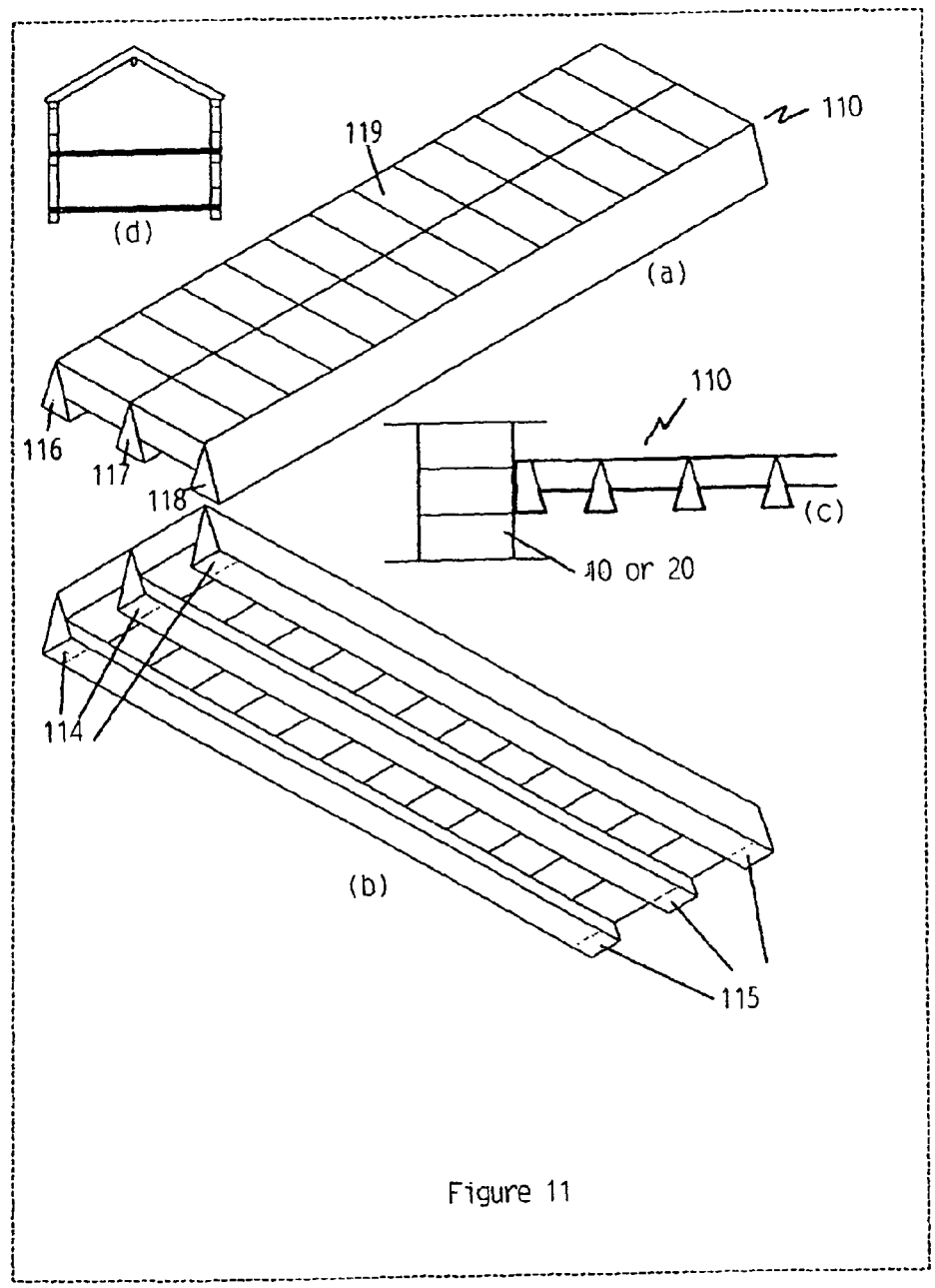
Figure 12:
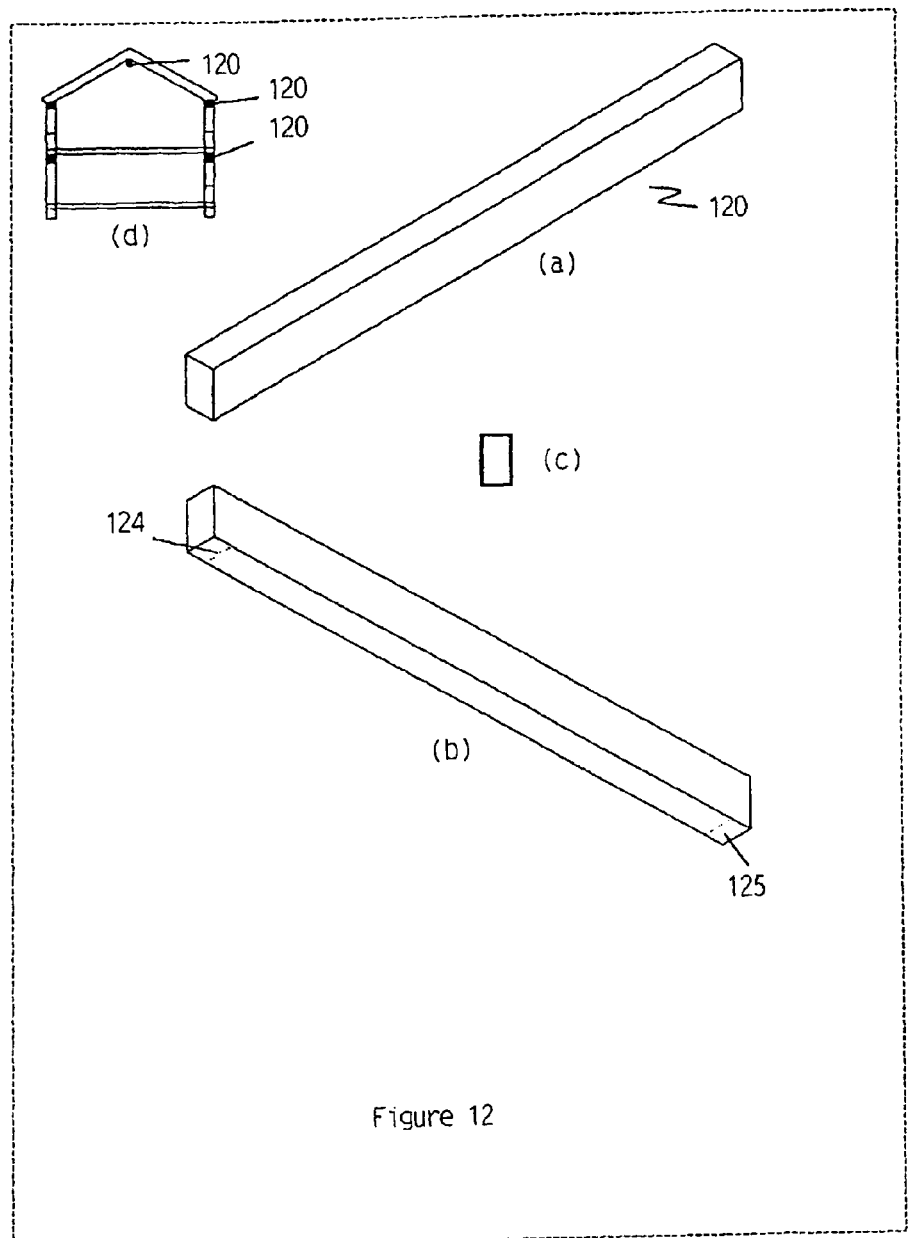
Figure 16:
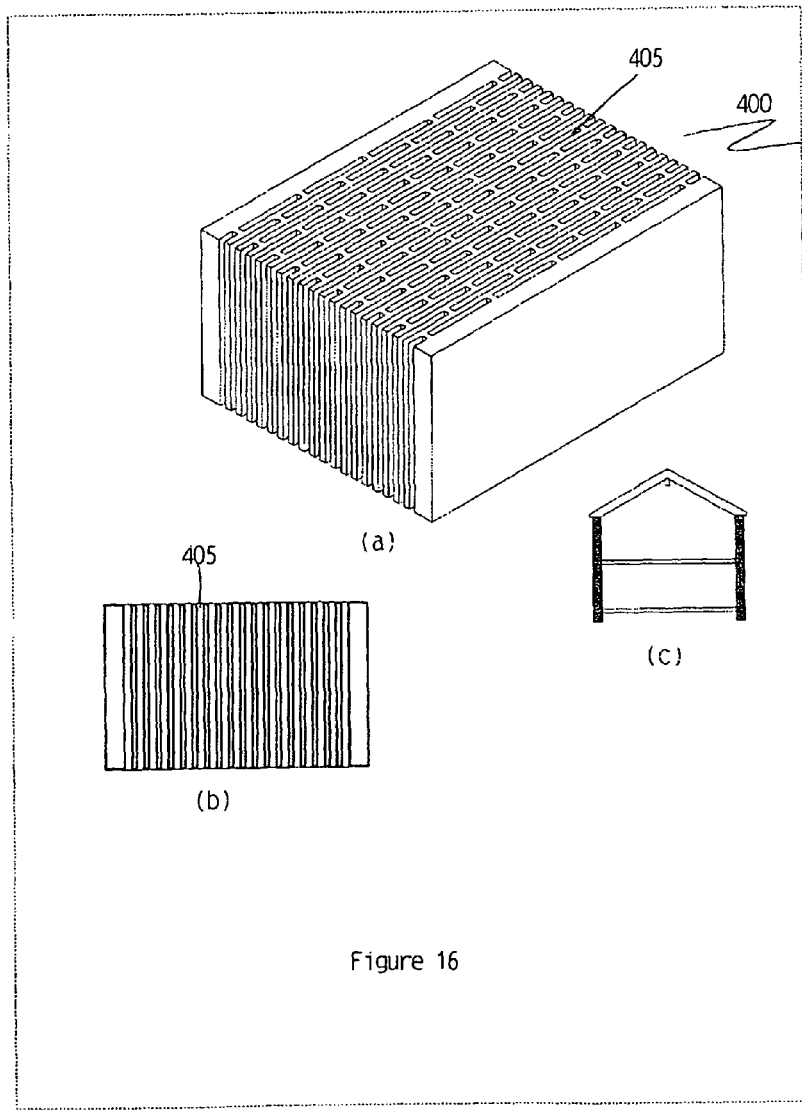
Figure 17:
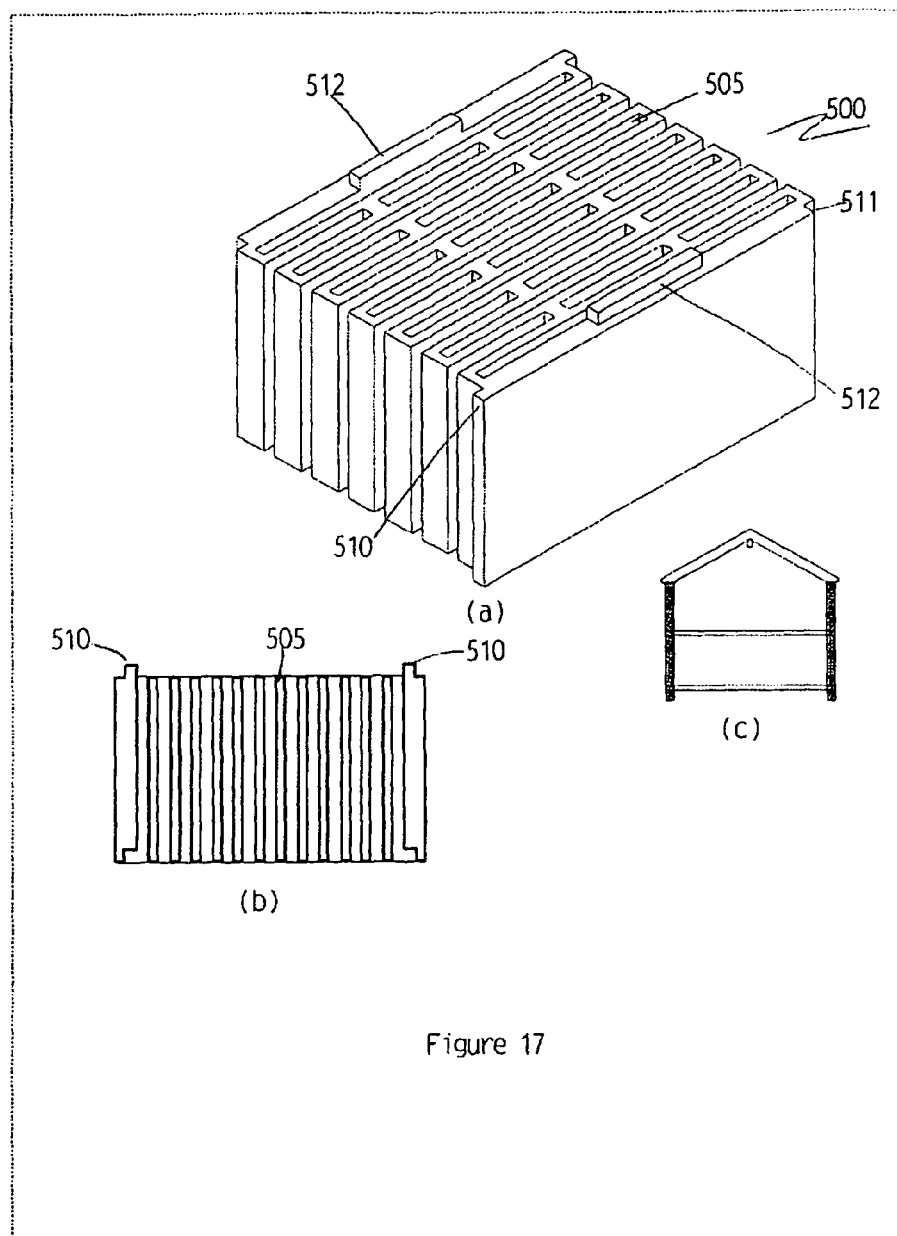

FIG. 2(a) is an isometric view of a second embodiment of a geopolymer structural building unit of the present invention for building a wall (a wall building unit in a second embodiment);

FIG. 2(b) is a sectional view of the wall building unit of FIG. 2(a);

and FIG. 2(c) is a schematic sectional view through a building such as a house, showing the location, in use, of the wall building of FIGS. 2(a) and 2(b) (location of unit(s) shown in shading);

FIG. 3(a) is an isometric view from above of an alternative embodiment of a structural building unit which is for constructing a roof (a roof building unit in a first embodiment);

FIG. 3(b) is an isometric view from below of the roof building unit of FIG. 3(a);

FIG. 3(c) is a sectional view showing a series of roof building units of FIGS. 3(a) and 3(b) arranged in a stacked manner to construct a roof; and FIG. 3(d) is a schematic sectional view through a building such as a house showing the location, in use, of the roof building unit in the first embodiment shown in FIGS. 3(a), (b) and (c) (location of unit(s) show in shading);

FIG. 4(a) is an isometric view from above of an alternative embodiment of a structural building unit which is for constructing a roof (a roof building unit in a second embodiment);

FIG. 4(b) is an isometric view from below of the roof building unit of FIG. 4(a);

FIG. 4(c) is a sectional view showing a series of roof building units of FIGS. 4(a) and 4(b) arranged in a stacked manner to construct a roof; and FIG. 4(d) is a schematic sectional view through a building such as a house showing the location, in use, of the roof building unit in the second embodiment as shown in FIGS. 4 (a), (b) and (c) (location of unit(s) shown in shading);

FIG. 5(a) is an isometric view from above of an alternative embodiment of a structural building unit which is for constructing a roof (a roof building unit in a third embodiment);

FIG. 5(b) is an isometric view from below of the roof building unit of FIG. 5(a);

FIG. 5(c) is a sectional view showing a series of roof building units in the third embodiment as shown in FIGS. 5(a) and 5(b) arranged in an abutting manner to construct a roof; and FIG. 5(d) is a schematic sectional view through a building such as a house showing the location, in use, of the roof building unit in the third embodiment as shown in FIGS. 5 (a), (b) and (c) (location of unit(s) shown in shading);

FIG. 6(a) is an isometric view from above of an alternative embodiment of a structural building unit which is for constructing a roof (a roof building unit in a fourth embodiment);

FIG. 6(b) is an isometric view from below of the roof building unit of FIG. 6(a);

FIG. 6(c) is a sectional view showing a series of roof building units in the fourth embodiment as shown in FIGS. 6(a) and 6(b) arranged in an abutting manner to construct a roof; and FIG. 6(d) is a schematic sectional view through a building such as a house showing the location, in use, of the roof building unit in the fourth embodiment shown in FIGS. 6 (a), (b) and (c) (location of unit(s) shown in shading);

FIG. 7(a) is an isometric view from above of an alternative embodiment of a structural building unit which is also for constructing a roof (a roof building unit in a fifth embodiment);

FIG. 7(b) is an isometric view from below of the roof building unit of FIG. 7(a);

FIG. 7(c) is a sectional view showing a series of roof building units of FIGS. 7(a) and 7(b) arranged in an abutting manner to construct a roof;

FIG. 7(d) is a schematic sectional view through a building such as a house showing the location, in use, of the roof building unit in the fifth embodiment as shown in FIGS. 7 (a), (b) and (c) (location of unit(s) shown in shading);

FIG. 8(a) is an alternative embodiment of the structural building unit which in this embodiment is also for constructing a roof (roof constructing structural building unit in a sixth embodiment);

FIG. 8(b) is an isometric view from below of the roof building unit of FIG. 8(a);

FIG. 8(c) is a sectional view showing a series of roof building units of FIGS. 8(a) and 8(b) arranged in an abutting manner to construct a roof;

FIG. 8(d) is a schematic sectional view through a building such as a house showing the location, in use, of the roof building unit in the sixth embodiment as shown in FIGS. 8 (a), (b) and (c) (location of unit(s) shown in shading);

FIG. 9(a) is an alternative embodiment of the structural building unit which in this embodiment is for constructing a floor or a flat roof (floor or flat roof constructing structural building unit in a first embodiment);

FIG. 9(b) is an isometric view from below of the floor or flat roof building unit of FIG. 9(a);

FIG. 9(c) is a sectional view showing a series of floor or flat roof building units of FIGS. 9(a) and 9(b) arranged in an abutting manner to construct a floor or flat roof; and FIG. 9(d) is a schematic sectional view through a building such as a house showing the location, in use, of the floor or flat roof building unit in the first embodiment as shown in FIGS. 9 (a), (b) and (c) (location of unit(s) shown in shading);

FIG. 10(a) is an alternative embodiment of the structural building unit which in this embodiment is also for constructing a floor or a flat roof (floor or flat roof constructing structural building unit in a second embodiment);

FIG. 10(b) is an isometric view from below of the floor or flat roof building unit of FIG. 10(a);

FIG. 10(c) is a sectional view showing a series of floor or flat roof building units of FIGS. 10(a) and 10(b) arranged in a manner to construct a floor or flat roof;

FIG. 10(d) is a schematic sectional view through a building such as a house showing the location, in the structure, of the floor or flat roof building unit in the second embodiment as shown in FIGS. 10 (a), (b) and (c) (location of unit(s) shown in shading);

FIG. 11(a) is an alternative embodiment of the structural building unit which in this embodiment is also for constructing a floor or a flat roof (floor or flat roof constructing structural building unit in a third embodiment);

FIG. 11(b) is an isometric view from below of the floor or flat roof building unit of FIG. 11(a);

FIG. 11(c) is a sectional view showing a series of roof building units of FIGS. 11(a) and 11(b) arranged in a manner to construct a floor or flat roof; and FIG. 11(d) is a schematic sectional view through a building such as a house showing the location, in use, of the roof building unit in the third embodiment shown in FIGS. 11 (a), (b) and (c) (location of unit(s) shown in shading);

FIG. 12(a) is an isometric view from above of an alternative embodiment of a structural building unit which is a beam or lintel;

FIG. 12(b) is an isometric view from below of the beam or lintel unit of FIG. 12(a);

FIG. 12(c) is a sectional view of the beam or lintel unit of FIGS. 12(a) and 12(b); and FIG. 12(d) is a schematic sectional view through a building such as a house showing the location, in use, of the beam or lintel as shown in FIGS. 12 (a), (b) and (c) (location of unit(s) shown in shading); and FIG. 13(a) is an isometric view from above, of the eaves structural unit which is shown included with respective roof structural units in FIGS. 6(c) and 7(c);

FIG. 13(b) is an isometric view from below, of the eaves structural unit which is shown included with respective roof structural units in FIGS. 6(c) and 7(c);

FIG. 13(c) is a sectional view showing the roof structural unit of FIG. 6 in use together with the eaves structural unit of FIGS. 13(a) and (b);

FIG. 13(d) is a sectional view showing the roof structural unit of FIG. 7 in use together with the eaves structural unit of FIGS. 13(a) and (b);

FIG. 13(e) is a schematic sectional view through a building such as a house showing the location, in use, of the eaves structural unit of FIGS. 13(a) and (b) (location of unit(s) shown in shading);

FIG. 14(a) is an isometric view of an alternative embodiment of a geopolymer structural building unit of the present invention for building a wall (a wall building unit in an alternative embodiment);

FIG. 14(b) is a sectional view of the wall building unit of FIG. 14(a);

and FIG. 14(c) is a schematic sectional view through a building such as a house, showing the location, in use, of the wall building unit of FIGS. 14(a) and 14(b) (location of unit(s) shown in shading);

FIG. 15(a) is an isometric view of an alternative embodiment of a geopolymer structural building unit of the present invention for building a wall (a wall building unit in an alternative embodiment);

FIG. 15(b) is a sectional view of the wall building unit of FIG. 15(a);

and FIG. 15(c) is a schematic sectional view through a building such as a house, showing the location, in use, of the wall building unit of FIGS. 15(a) and 15(b) (location of unit(s) shown in shading);

FIG. 16(a) is an isometric view of an alternative embodiment of a geopolymer structural building unit of the present invention for building a wall (a wall building unit in an alternative embodiment);

FIG. 16(b) is a sectional view of the wall building unit of FIG. 16(a);

and FIG. 16(c) is a schematic sectional view through a building such as a house, showing the location, in use, of the wall building unit of FIGS. 16(a) and 16(b) (location of unit(s) shown in shading);

FIG. 17(a) is an isometric view of an alternative embodiment of a geopolymer structural building unit of the present invention for building a wall (a wall building unit in an alternative embodiment);

FIG. 17(b) is a sectional view of the wall building unit of FIG. 17(a);

and FIG. 17(c) is a schematic sectional view through a building such as a house, showing the location, in use, of the wall building unit of FIGS. 17(a) and 17(b) (location of unit(s) shown in shading).

EXAMPLES

Process for Producing Geopolymer Cements Having the Necessary Properties Needed for the Structural Building Units of the Invention In the production of construction materials, the composition of the basic geopolymer cement used remains the same. Various aggregates and fillers are added to the geopolymer cement to form a geopolymer concrete. The amount and type of aggregates and fillers can be varied to obtain the desired properties in the resulting geopolymer concrete and in the structural building units which can be made from the geopolymer concrete.

In use, construction units under compression will be required to have characteristic compression strength up to 10 $N/mm^2$. However, compressive strengths up to 100 $N/mm^2$ and even up to 120 $N/mm^2$ have been achieved in the geopolymer cements of the present invention. Where increased tensile strength is required, the required structural integrity is achieved by wrapping the material in either an organic resin fibre or a geopolymer fibre composite.

The following examples are illustrative of the present invention and in no way is the invention limited to the proportions given.

Example 1

A mixture for the geopolymer cement of the present invention is detailed in the Example below.

First the aluminosilicate powder is prepared in mixture A.
Mixture A:

| | |
|---|---|
| Calcined Interbasaltic material from Northern Ireland | 204 g |
| Ground Granulated Blastfurnace Slag (GGBS) | 29 g |

This 233g of powder is then added to the liquid component, Mixture B.

Mixture B:

| | |
|---|---|
| Potassium Silicate ($SiO_2$—26.6%; $K_2O$—30.7%; $H_2O$—41.2%) | 140 g |
| Added Water | 29 g |

The calcined weathered Interbasaltic material from Northern Ireland is preferably a dehydroxylated lithomarge such as is found in Co. Antrim, Northern Ireland, is calcined at 750° C. for 6 hours and then milled to a fine powder with a median particle size of 95 microns. The calcined weathered Interbasaltic material from Northern Ireland is preferably a dehydroxylated lithomarge such as is found in Co. Antrim, Northern Ireland and has a chemical composition containing approx 35% $SiO_2$; 25% $Al_2O_3$; 21% $Fe_2O_3$ and 2.5% $TiO_2$ (average amounts). This composition is quite different from the prior art in which the $Al_2O_3$ content is lower. This composition equates to a calculated Si:Al atomic ratio of 1.18:1.

The solution formed is mixed at slow speed until the dry ingredients are completely wetted out and then mixed at high speed with a high shear mixer for 1 minute until the mixture becomes fluid. The mixture has a working time of approximately 1 hour at 20° C. in this form however, by altering the GGBS content it is possible to vary the setting time between 10 minutes up to 2 hours. The mixture can then be cast into a mould and sealed to avoid evaporation of water during curing. It is possible to demould the specimen after 2 hours at 20° C.

In terms of oxide mole ratios, the reactant mixture contains the following oxide mole ratios; however, it must be noted that for the larger particles not all of the particle is dissolved and the reaction will only take place on the surface of the particle.

$K_2O/SiO_2$—0.23
$SiO_2/Al_2O_3$—3.68
$H_2O/K_2O$—10.76
$K_2O/Al_2O_3$—0.83

Example 2

The geopolymer cement of Example 1 may also be used to form a general purpose geopolymer concrete. In this Example, a geopolymer concrete is produced using the geopolymer cement of Example 1 mixed with aggregate. The resulting geopolymer concrete will achieve a compressive strength of 25 $N/mm^2$ after curing for 28 days at room temperature.

| | |
|---|---|
| Standard Mixture of Example 1 | 1759 g |
| Concrete Sand | 2212 g |
| 10 mm Crushed Rock Aggregate | 3475 g |
| Added Water | 250 g |

Example 3

Formation of Structural Building Unit for Constructing Walls

The geopolymer cement of Example 1 is mixed with other aggregates to produce the wall building unit of the present invention, formed of geopolymer concrete. The structural unit consists of three sections as shown in FIG. 1(a). The following procedure may be followed to which the manufacturing process of the invention is not limited.

A nylon or polycarbonate mould, complete with base and top plates, is used to produce a casting of the following dimensions: width—450mm; depth—225mm; height—450 mm. The mould is secured on a vibrating table and filled in sections.

Section 1—Face

To 1035g of the geopolymer cement of Example 1 is added the following mixture:

| | |
|---|---|
| Crushed Basalt (100% passing 6 mm) | 1734 g |
| Water | 197 g |

The water is adjusted to compensate for the moisture content of the crushed basalt—the figures shown are for a moisture content of 0.5%. The mixture is placed in a suitable forced action mixer and blended for 5 minutes at medium speed. The mixture is then decanted into the block mould and vibrated to remove air bubbles. The mixture is brought to a depth of 10mm above the base plate and allowed to stiffen before Section 2 is added.

Section 2—Insulation

To 7227g of the geopolymer cement of Example 1 is added the following mixture:

| | |
|---|---|
| Poraver Foamed Glass Aggregate 4-8 mm | 7834 g |
| Water | 743 g |

This mixture is mixed gently at a slow speed until all the lightweight aggregate particles have been coated in the geopolymer cement so as to produce the geopolymer concrete.

The geopolymer concrete is then placed into the mould onto the first section and vibrated into place at the same time as a light pressure is applied to the top surface of the material through a flat plate of dimensions 450mm by 225mm to gently compact the material without crushing the aggregate. The insulation material is filled into the mould to a finished level 375mm above the surface of the base plate.

Section 3—Load Bearing

To 6003g of the standard mixture of Example 1 is added the following mixture:

| | |
|---|---|
| Crushed Basalt (100% passing 6 mm) | 3512 g |
| Poraver Foamed Glass Aggregate (2-4 mm) | 714 g |
| Poraver Foamed Glass Aggregate (1-2 m) | 714 g |
| Water | 774 g |

The water is adjusted to compensate for the moisture content of the crushed basalt—the figures shown are for a moisture content of 0.5%. The material is mixed gently at a slow speed until all material is coated with the geopolymer cement. The mixture is placed into the mould onto the insulation section and vibrated into place with several short bursts of vibration. The mixture should be finished level with the top of the mould and covered with the top plate to seal in the moisture.

The geopolymer concrete should remain sealed and be allowed to cure for twenty-four hours at ambient temperature before being cured for a further twenty-four hours at 60° C. After this process, the structural building block should be allowed to dry to a constant weight.

The formed structural building unit (block) has three areas of different compressive strengths. Section 1 is the face section of the block and has a 28 day compressive strength of 15 N/mm² and a dry bulk density of 2000 kg/m³. Section 2 is the insulation section and has a compressive strength of 1.2 N/mm² and a dry bulk density of 450 kg/m³. Section 3 is the load-bearing section and has a strength of 12N/mm² and a dry bulk density of 1150 kg/m³.

Example 4

As a further example, a building unit with a higher insulation value may also be manufactured which consists of a lightweight geopolymer material cast on to an expanded polystyrene section. This building unit can be seen in FIG. 14.

To form this building unit, one uses a section of Expanded Polystyrene (EPS) cut to the dimensions 450mm wide by 225mm high by 185mm deep. Two wedge-shaped channels are cut along the internal face of the block to provide the lightweight geopolymer concrete with a strong mechanical key. This polystyrene section is then placed into the base of a nylon or polycarbonate mould that has the base dimensions 450mm long by 225mm wide and is 350mm deep.

The lightweight geopolymer concrete is then prepared as described below and cast onto the EPS block, using vibration to remove air bubbles and compact the mixture. The mixture should be finished level with the top of the mould to give a geopolymer section 165mm deep and covered with the top plate to seal in the moisture.

The material should remain sealed and be allowed to cure for twenty-four hours at ambient temperature before being cured for a further twenty-four hours at 60° C. After this process the block should be allowed to dry to a constant weight.

The mixture composition is as follows:

| | |
|---|---|
| Standard Mixture of Example 1 | 13362 g |
| Crushed Rock Fines (passing 6 mm) | 7096 g |
| Poraver Foamed Glass (1-2 mm) | 1424 g |
| Poraver Foamed Glass (2-4 mm) | 1424 g |
| Water | 1528 g |

The finished block consists of two sections, one being the lightweight geopolymer concrete which has a twenty-eight day compressive strength of 12 N/mm² and is the internal load-bearing section, the other is the insulation section which is provided with an appropriate external insulation render system.

The overall U-value of the block in this example has been calculated to be less than 0.15 W/m²K.

Example 5

This example provides a geopolymer slurry to be used as an adhesive to securely join together the various structural building units of the present invention.

The slurry will be supplied in two parts as follows:
Part A

| | |
|---|---|
| Calcined Interbasaltic material from Northern Ireland | 20 g |
| Ground Granulated Blastfurnace Slag | 20 g |
| Calcined Diatomite | 20 g |

Part B

| | |
|---|---|
| Potassium Silicate ($SiO_2:K_2O = 1.25$) | 20 g |
| Water | 15 g |

Exoskeletal Reinforcement ("Wrapping") of the Structural Unit with a Reinforcement Layer)

A cured form of light weight material such as Example 3, section 2 is taken and a pure binder such as Example 1 in its viscous stage is applied to form a bond layer (i.e. the bond layer functioning as an adhesive). A layer of natural fibre such as linen or hemp is laid into the wet paste bond layer and thoroughly saturated with the binder. This needs to be rolled out with a roller to ensure that no air bubbles occur. Further layers may be added to achieve the required exoskeleton reinforcement. The lightweight material and exoskeleton reinforcement are sealed in an air tight container and cured at 60° C. Where numerous layers are required, interim curing may be required to ensure that no delamination takes place.

Referring now to the accompanying drawings, the structural building units in a number of alternative embodiments in accordance with the present invention will be described.

Referring initially to FIGS. 1(a), (b), and (c), a structural building unit in a first embodiment, for building a wall will be described. This wall building unit in the first embodiment is indicated generally by reference numeral 10 and includes an interior side 11 which in use, faces towards the interior of a building and an exterior side 12 which in use, faces towards the exterior of the building. The wall building unit 10 also includes an intermediate section 13 between the interior side 11 and the exterior side 12.

In use, wall building units 10 are used to build a single leaf wall construction having a U-value no greater than 0.16W/m²K. The wall building units 10 have a coefficient of linear thermal expansion of $9 \times 10^{-6}$ and a coefficient of volumetric thermal expansion of $27 \times 10^{-6}$, both at 20° C.

In this embodiment, the wall building units 10 can be enveloped by a layer of water proof material 14. However, this is by way of example only as water proofing may not be provided in the form of a film surrounding the structural units, but in an alternative embodiment, the water proofing may be provided throughout the structural units. The wall building unit 10 can be made water proof (14) by pre-treatment or post-treatment with silicone, silane or siloxane, either as a redispersible powder during manufacture or by post-treating with a micro-emulsion. Liquid is then prevented from passing through the wall but the water proof material 14 is permeable to air and water vapour so that a building constructed from the wall building units 10 can "breathe" i.e. is permeable to air and water vapour. The inclusion of the water proof material 14 has the distinct advantage that a layer of damp proof course (DPC) material is not required.

The interior side 11 of the wall building unit 10 is comprised of a geopolymer material of density A (800-1200 kg per m³) and has a minimum load bearing capacity of 5 N/mm². The intermediate section 13 is comprised of geopolymer material of density B which is a relatively low density of 250-450 kg per m³. The intermediate section 13 provides insulation. The exterior side 12 is comprised of geopolymer material of density C (500kg per m³ and upward).

The process for manufacturing the wall building unit 10 and the other embodiments of the structural building units of the present invention can produce the structural units within 48 hours whereas in contrast, known concrete blocks for conventional construction are produced in a continuous process which can take up to 4 days.

The wall building unit 10 has a maximum weight of 22kg per unit and so the units 10 can be handled easily.

Figure 2:
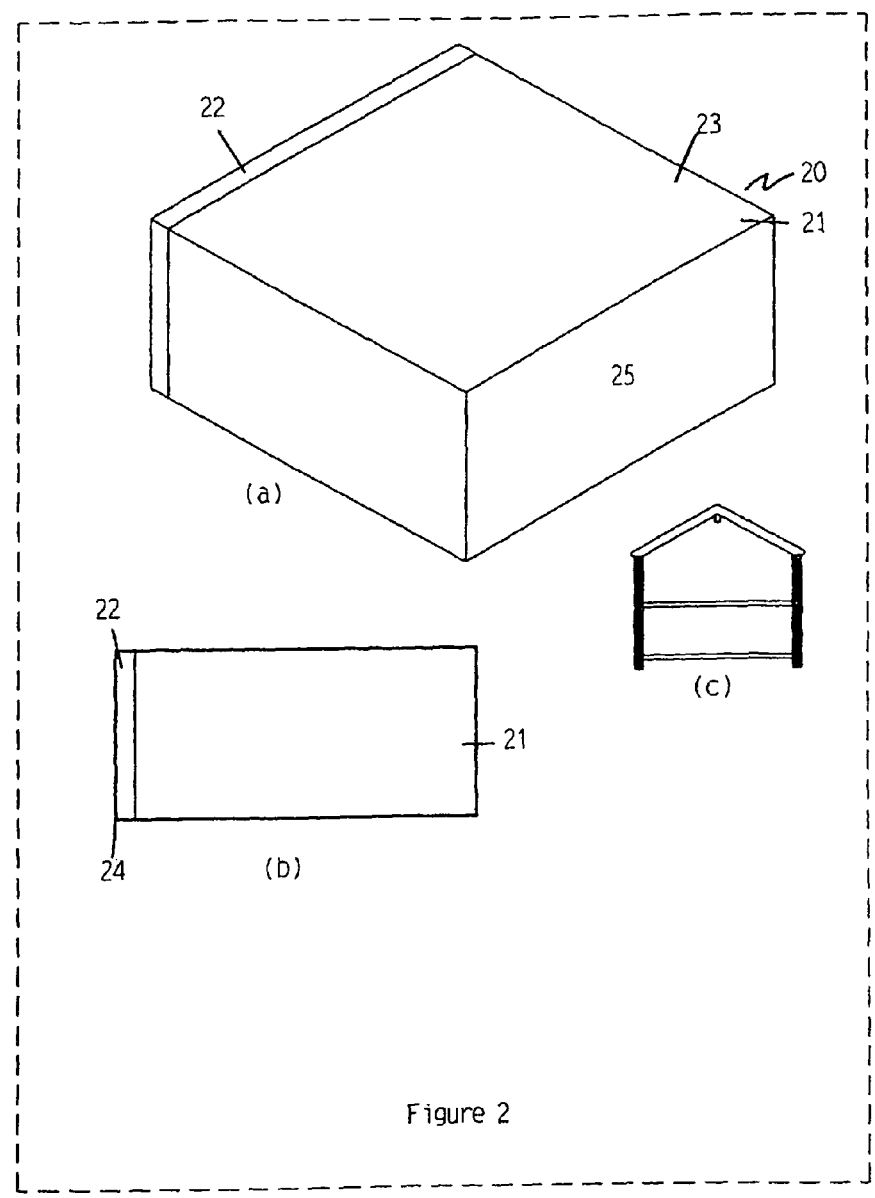

Referring now to FIGS. 2 (*a*), (*b*) and (*c*), a wall building unit in an alternative embodiment will be described. The wall building unit in this embodiment is indicated generally by reference numeral 20 and includes an exterior side 22 having density C (500kg per m$^3$ and upward) and an interior side 21 having a variable density A (from 200kg per m$^3$ up to 1200kg per m$^3$) on the inside graduated to no less than 200kg per m$^3$ on the outside. In this embodiment, there is no distinct intermediate section having a pre-determined density as in the wall building unit 10. Instead, in the wall building unit 20, the density varies across the wall building unit 20 from the material density A (200-800kg per m$^3$) at the interior side 21 and having a minimum load bearing capacity of 5 N/mm$^2$ for a distance of approximately 100mm into the unit from the interior face 25 to a zone 23 between the exterior side 22 and the interior side 21. In zone 23, the density is varied, gradually reducing the density from density A at interior side 21 to density B (200kg per m$^3$) at the other outer extreme of zone 23. The exterior side 22 is comprised of material of density C (500kg per m$^3$ and upward). The wall building unit 20 is enveloped by a layer of water proof material 24 which is the same as the water proof material 14 enveloping the wall building unit 10. Thus, the wall building units 20 can be water proofed by pre-treatment or post-treatment with silicone, silane or siloxane, either as a redispersible powder during manufacture or by post-treating with a micro-emulsion. The inclusion of the water proof material has the distinct advantage that a layer of damp proof course (DPC) material is not required while nevertheless achieving high insulation values.

The wall building unit 20 can bear loads across the entire unit 20.

The wall building units 20 can be used to form a single leaf wall construction building with a U-value no greater than 0.16W/m$^2$K. Units 20 have a coefficient of linear thermal expansion of 9×10$^{-6}$ and a coefficient of volumetric thermal expansion of 27×10$^{-6}$, both at 20° C.

Regardless of whichever embodiment of the building units of the present invention that is being used, the building units are to be joined using a fine geopolymer slurry as an adhesive. An Example of the geopolymer slurry is given in Example 5. These are generally applied using a brush, roller, trowel or spray. The slurry will be supplied as a two pack product comprising a blended feedstock powder (Part A) and a liquid reagent (Part B)—see Example 5. These are mixed on site prior to application. The joins will be nominally be under 1mm, but can be up to 3mm thick.

Figure 3:
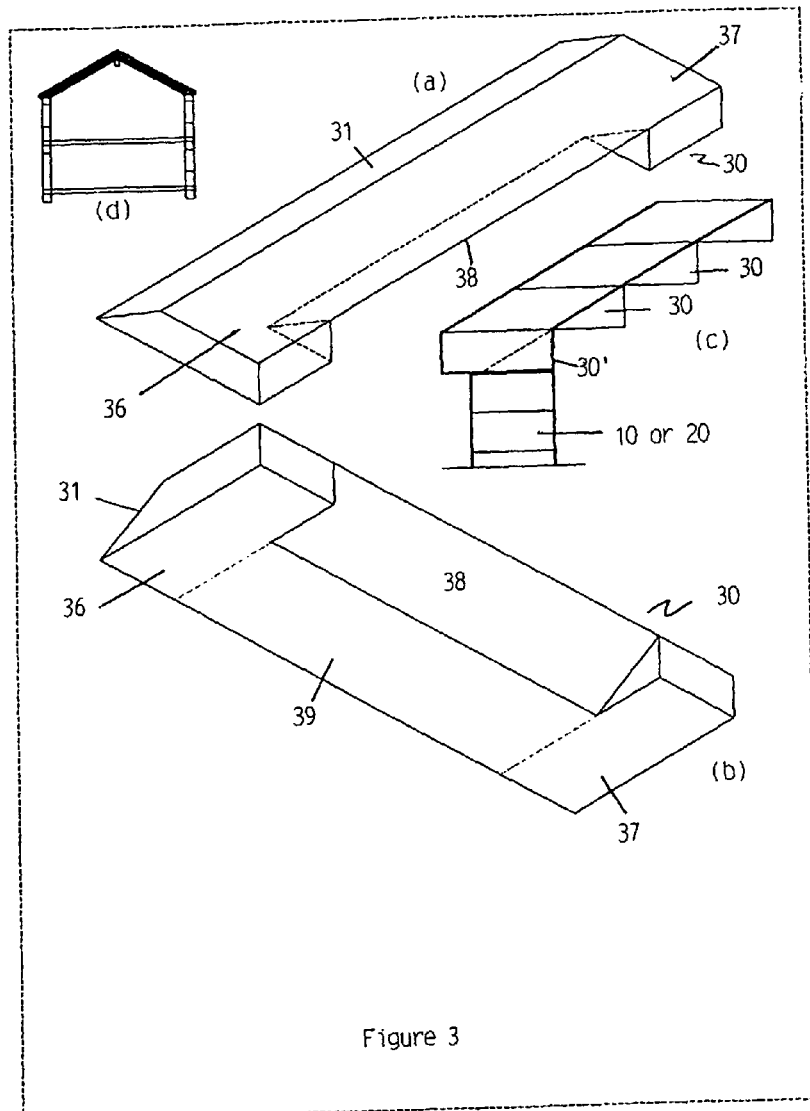

Referring now to FIGS. 3(*a*), (*b*), (*c*) and (*d*), an alternative embodiment of the structural building units of the present invention will be described. In this embodiment, the structural building unit is for building a sloped roof of the type shown in FIG. 3(*d*). The roof building unit in this embodiment is indicated generally by reference numeral 30. The roof building unit 30 is of a particular shape adapted to rest on top of other roof building units 30 as shown in FIG. 3(*c*) in a manner that provides a sloped roof. The lower roof building unit 30' rests on a wall building unit 10 or 20 described above. The roof building unit 30' is truncated to form the eaves. The cut off portion is adhered using geopolymer material as the bond layer, to the rear of the roof building unit 30'. The use of geopolymer slurry as an adhesive for adhering (gluing) the structural building units and parts of units together has been described above.

Each roof building unit 30 has a bevel edge 31, a first load bearing shoulder 36 and a second load bearing shoulder 37 and a sloped cut-out section 38. There is a span 39 between shoulders 36 and 37. The roof slopes at angle α between 20° and 45° (preferred 25°-35°).

The units 30 form an overlapped and glued roof construction with a U-value no greater than 0.16W/m$^2$K. Units 30 can be water proofed by pre-treatment or post-treatment with silane, silicone or siloxane, either as a redispersible powder or as a micro-emulsion. Units 30 have a coefficient of linear thermal expansion of 9×10$^{-6}$ and a coefficient of volumetric thermal expansion of 27×10$^{-6}$, both at 20° C.

Units 30 can be wrapped with an organic resin fibre composite or a geopolymer fibre composite membrane to increase tensile strength. The area of surface covered by this membrane can vary from 0% to 100%.

Referring now to FIGS. 4 (*a*), (*b*), (*c*) and (*d*), a sloped roof building unit in an alternative embodiment is indicated generally by reference numeral 40. The roof building unit 40 has bevelled edges 41 and 42 as well as load bearing zones 46 and 47. As shown in FIG. 4(*c*), in use the roof building units 40 are resting on top of each other. The lowermost roof building unit 40' is resting on the wall building units 10 or 20 with the lowermost roof building unit 40' being truncated to form the eaves. The cut off piece can be recycled. The roof is sloped at angle α of between 20° and 45° (preferred 25°-35°) and most preferably, angle α is 30°.

The structural units 40 form an overlapped and glued roof construction with a U-value no greater than 0.16W/m$^2$K. Units 40 can be water proofed by pre-treatment or post-treatment with silane, silicone or siloxane, either as a redispersible powder or as a micro-emulsion. Units 40 have a coefficient of linear thermal expansion of 9×10$^{-6}$ and a coefficient of volumetric thermal expansion of 27×10$^{-6}$, both at 20° C.

The roof building units 40 are wrapped with an organic resin fibre composite or a geopolymer fibre composite membrane to increase their tensile strength. The area of surface covered by this membrane can vary from 0% to 100%.

Referring now to FIGS. 5(*a*), (*b*), (*c*) and (*d*), a roof building unit in a further alternative embodiment is indicated generally by reference numeral 50. In this embodiment, the structural building unit 50 is also for building a sloped roof of the type shown in FIG. 5(*d*). The roof building unit 50 is of a particular shape adapted to rest on top of other roof building units 50 as shown in FIG. 5(*c*) in a manner that provides a sloped roof. The lower roof building unit 50' rests on a wall building unit 10 or 20 described above. The roof building unit 50' is truncated to form the eaves. The cut off portion is glued using geopolymer material (in the manner described above with reference to unit 30), to the rear of the roof building unit 50'.

The units 50 have a U-value no greater than 0.16W/m$^2$K. Units can be water proofed by pre-treatment or post-treatment with silane, silicone or siloxane, either as a redispersible powder or as a micro-emulsion. Units 50 have a coefficient of linear thermal expansion of 9×10$^{-6}$ and a coefficient of volumetric thermal expansion of 27×10$^{-6}$, both at 20° C.

The roof building units 50 are wrapped with an organic resin fibre composite or a geopolymer fibre composite membrane to increase tensile strength. The area of surface covered by this membrane can vary from 0% to 100%.

Figure 13:
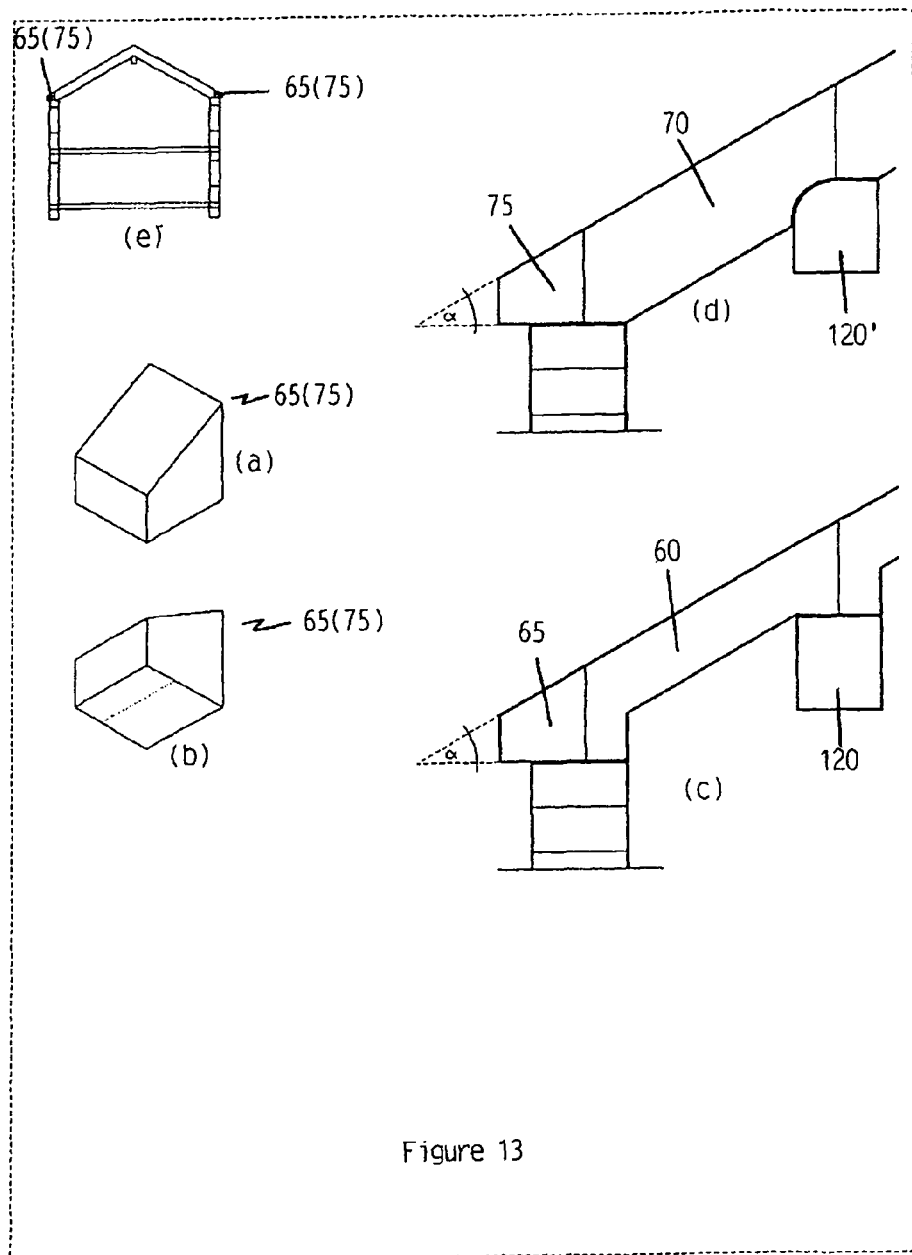

Referring now to FIG. 6 and to FIG. 13(*c*), an alternative embodiment of a structural unit of the present invention is indicated generally by reference numeral 60. The structural unit 60 is an infill unit that follows the slope of the roof that is supported by geopolymer walls/purlins.

The structural unit 60 has two load-bearing shoulders 66 and 67. The shoulder 66 rests on the wall units 10 or 20/or the beam unit 120 (purlin) and the shoulder 67 rests on a beam unit 120 (purlin) or wall unit (The beam unit 120 is shown in FIG. 12 and described in detail hereinbelow).

Structural units 60 are placed adjacent to and in abutment with each other to form the roof. An "eaves unit" is shown, indicated by reference numeral 65 and this eaves unit 65 is also provided by the present invention. The eaves unit 65 is specifically adapted and produced to finish the construction of the eaves as shown in FIG. 13(c). The eaves unit 65 is shown by itself in FIGS. 13(a) and 13(b). As shown in FIG. 13(c), the roof constructed using structural units 60 and eaves unit 65 is sloped at angle α which is between 20° and 45°, preferably between 25° and 35° and most preferably the angle α is 30°.

The units 60 form an overlapped and glued roof construction with a U-value no greater than 0.16W/m²K. Units 60 can be water proofed by pre-treatment or post-treatment with, silane, silicone or siloxane, either as a redispersible powder or as a micro-emulsion. The structural units 60 have a coefficient of linear thermal expansion of $9 \times 10^{-6}$ and a coefficient of volumetric thermal expansion of $27 \times 10^{-6}$, both at 20° C.

The structural units 60 can be wrapped with an organic resin fibre composite or a geopolymer fibre composite membrane to increase tensile strength (as described above with reference to FIG. 3). The area of surface covered by this membrane can vary from 0% to 100%.

The structural unit 60 includes a span 69 between the respective shoulders 66 and 67.

Referring now to FIGS. 7(a), (b), (c) and (d) and to FIG. 13(d), an alternative embodiment to the structural unit 60 is shown and is indicated generally by reference numeral 70. The structural unit 70 has a curved cut out shoulder 77 which in use, rests on the curved beam unit 120', while the shoulder 78 rests on the wall units 10 or 20 as shown in FIG. 7(c). An "eaves unit" is shown, indicated by reference numeral 75 and this eaves unit 75 is also provided by the present invention. The eaves unit 75 is specifically adapted and produced to finish the construction of the eaves as shown in FIG. 13(d). The eaves unit 75 is the same as eaves unit 65 and eaves unit 75 is shown in use with structural units 70 in FIG. 13(d). The angle α is the same as described in relation to FIG. 13(c) above.

Units 70 form an overlapped and glued roof construction with a U-value no greater than 0.16W/m²K. Units 70 can be water proofed by pre-treatment or post-treatment with, silane, silicone or siloxane either as a redispersible powder or as a micro-emulsion. Units have a coefficient of linear thermal expansion of $9 \times 10^{-6}$ and a coefficient of volumetric thermal expansion of $27 \times 10^{-6}$, both at 20° C.

The structural units 70 can be wrapped with an organic resin fibre composite or a geopolymer fibre composite membrane to increase tensile strength. The area of surface covered by this membrane can vary from 0% to 100%.

Referring now to FIGS. 8(a), (b), (c) and (d), an alternative embodiment of the roof building structural units is shown and is indicated by reference numeral 80. The structural unit 80 provides an alternative to the sloped roof structural units 60 and 70. The structural unit 80 is an elongated unit with a plurality of curved cut-out portions shaped and adapted to engaging fit onto the beam unit 120'. At one end of the structural unit 80, is a sloped cut-out portion 88 which is shaped to rest on a portion of the wall unit 10 or 20 as shown in FIG. 8(c). It should be noted that in this embodiment of the roof structural unit shown in FIG. 8, use of an eaves unit is not required.

Units 80 form an overlapped and glued roof construction with a U-value no greater than 0.16W/m²K. Units 80 can be water proofed by pre-treatment or post-treatment with silane, silicone or siloxane, either as a redispersible powder or as a micro-emulsion. Units 80 have a coefficient of linear thermal expansion of $9 \times 10^{-6}$ and a coefficient of volumetric thermal expansion of $27 \times 10^{-6}$, both at 20° C.

Units 80 can be wrapped with an organic resin fibre composite or a geopolymer fibre composite membrane to increase tensile strength. Area of surface covered by this membrane can vary from 0% to 100%.

Referring now to FIGS. 9(a), (b), (c) and (d), an alternative structural unit is shown and is indicated generally by reference numeral 90. The structural unit 90 is adapted for constructing a floor as shown in FIG. 9(d) or a flat roof.

The structural unit 90 includes infill units 99 which fit between beams 96 and 97 which rest on wall 10 or 20 or on beams 120. This method can be used for ground floor or intermediate floor construction. The minimum load bearing zones of the structural units 90 are indicated by reference numerals 94 and 95.

The structural units 90 have a coefficient of linear thermal expansion of $9 \times 10^{-6}$ and a coefficient of volumetric thermal expansion of $27 \times 10^{-6}$, both at 20° C.

The structural units 90 are wrapped with an organic resin fibre composite or a geopolymer fibre composite membrane to increase tensile strength. The area of surface covered by the geopolymer fibre composite membrane can vary from 0% to 100%. In use, the structural units 90 are connected together as necessary, to counter lateral forces.

In some instances, a mechanical fixing will be used to connect the structural units 90 together. In other instances, connection between adjacent structural units 90 may be achieved by gluing using geopolymer slurry as adhesive. The structural units 90 may be water proofed by pre-treatment or post-treatment with silane, silicone or siloxane, either as a redispersible powder or as a micro-emulsion. This will occur when used in a roof and basement construction.

Referring now to FIGS. 10 (a), (b), (c) and (d), an alternative structural unit is shown and is indicated generally by reference numeral 100. The structural unit 100 is a structural unit for constructing a floor as shown in FIG. 10(d) or a flat roof.

The structural unit 100 includes infill units 109 which fit between beams 106 and 107 which rest on wall 10 or 20 or on beams 120. This method can be used for ground floor or intermediate floor construction. The minimum load bearing zones of the floor joists 100 are indicated by reference numerals 104 and 105.

In some instances, a mechanical fixing will be used to achieve connection between structural units 100. In other instances, the connection between the structural units 100 may be achieved by gluing using geopolymer slurry as adhesive. The structural units 100 may be water proofed by pre-treatment or post-treatment with silane, silicone or siloxane, either as a redispersible powder or as a micro-emulsion. This will occur when the structural units 100 are used in a roof and basement construction.

The structural units 100 have a coefficient of linear thermal expansion of $9 \times 10^{-6}$ and a coefficient of volumetric thermal expansion of $27 \times 10^{-6}$, both at 20° C.

The structural units 100 are wrapped with an organic resin fibre composite or a geopolymer fibre composite membrane to increase tensile strength. The area of surface covered by the geopolymer fibre composite membrane can vary from 0% to 100%.

Referring now to FIGS. 11(a), (b), (c) and (d), an alternative structural unit is shown and is indicated generally by reference numeral 110. The structural unit 110 is a structural unit for constructing a floor as shown in FIG. 11(d) or a flat roof.

The unit 110 includes a main body 119 includes infill units 119 which fit between three beams 116, 117 and 119 which rest on wall 10 or 20 or on beams 120. This method can be used for ground floor or intermediate floor construction. The minimum load bearing zones of the floor joists 110 are indicated by reference numerals 114 and 115.

In some instances, a mechanical fixing will be used to achieve connection between the structural units 110. In other instances the connection can be achieved by gluing using geopolymer slurry as adhesive. This product may be water proofed by pre-treatment or post-treatment with silane, silicone or siloxane, either as a redispersible powder or as a micro-emulsion. This will occur when used in a roof and basement construction.

Units 110 have a coefficient of linear thermal expansion of $9 \times 10^{-6}$ and a coefficient of volumetric thermal expansion of $27 \times 10^{-6}$, both at 20° C.

Units 110 are wrapped with an organic resin fibre composite or a geopolymer fibre composite membrane to increase tensile strength. Area of surface covered can vary from 0% to 100%. The infill blocks 110 are twinned, i.e. two are connected together, (in some instances a mechanical fixing will be used, in other instances it may be glued) one either side of floor unit to counter lateral forces.

Referring now to FIG. 12, a beam or lintel is shown and is indicated generally by reference numeral 120. The beam 120 has already been shown in use in FIG. 6(c) and an alternative shape of beam has been indicated by reference numeral 120' in FIGS. 7 and 8. The beam 120 has a minimum load bearing zone 124 at one end thereof and 125 at the other end thereof.

Units 120 have a coefficient of linear thermal expansion of $9 \times 10^{-6}$ and a coefficient of volumetric thermal expansion of $27 \times 10^{-6}$, both at 20° C.

Units 120 can be wrapped with an organic resin fibre composite or a geopolymer fibre composite membrane to increase tensile strength. The area of surface covered by this membrane can vary from 0% to 100%.

Referring now to FIGS. 14(a), (b), (c) and FIGS. 15(a), (b), (c) further alternative embodiments will now be described.

Referring initially to FIGS. 14(a), (b) and (c) as alternative structural wall building unit is indicated generally by reference numeral 200 is shown.

The structural building unit, in this embodiment, is a wall building unit 200 comprising two types of materials, namely the geopolymeric cement of the present invention as material A (comprising the interior portion 201 of unit 200); and a material B comprising the exterior portion 202 of unit 200. The reference to interior portion means that a portion 201 faces the interior of a building to be constructed of units 200; and portion 202 is located facing the exterior (outside) of the building to be constructed of units 200.

The material A comprises the geopolymeric cement of the present invention, together with aggregates/fillers to form the geopolymeric concrete; and has a load bearing capacity of between 3 and 15 $N/mm^2$.

The material B comprises expanded polystyrene (EPS rigid polystyrene).

Units 200 form a single leaf wall construction with varying U values, depending on block thickness.

Units 200 can be made water-proof by pre-treatment or post-treatment with silicone, silane or siloxane, either as a redispersible powder or as a micro-emulsion.

Figure 14:
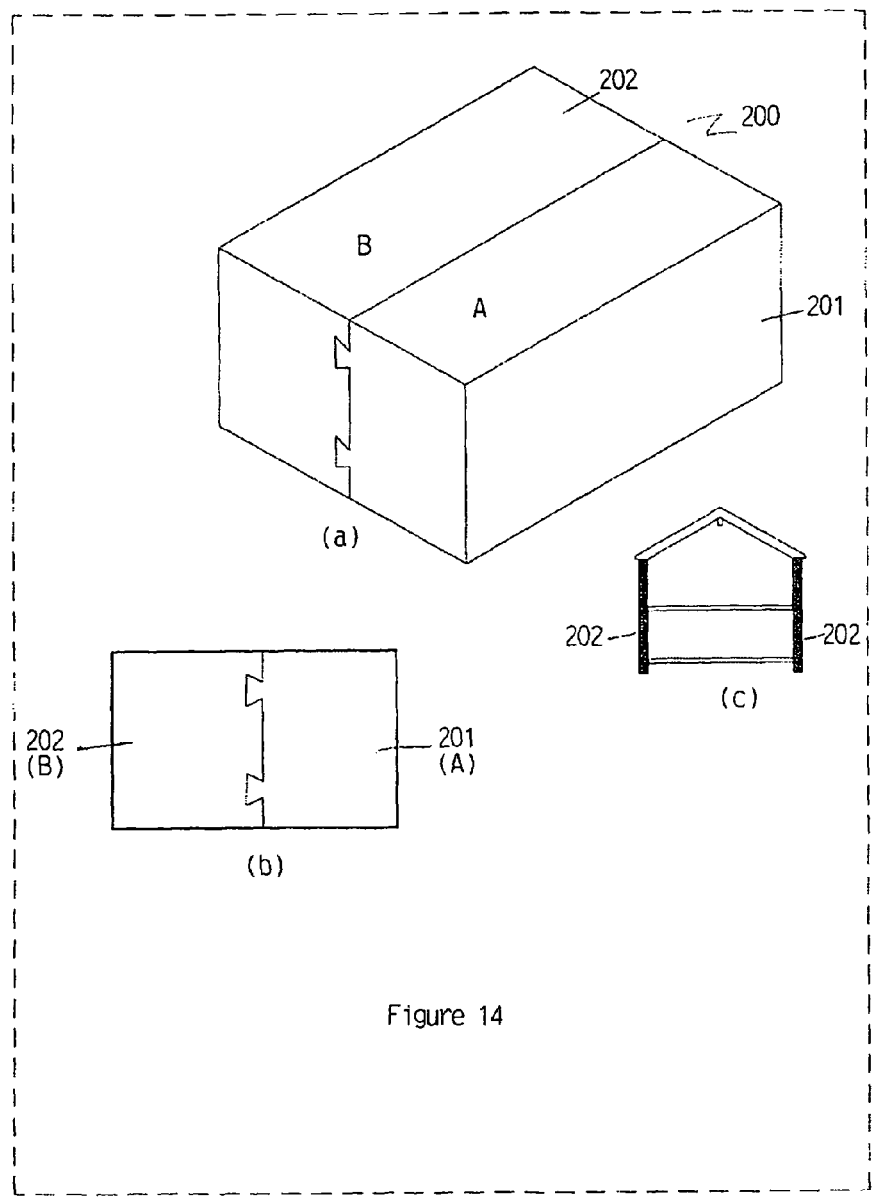
Figure 15:
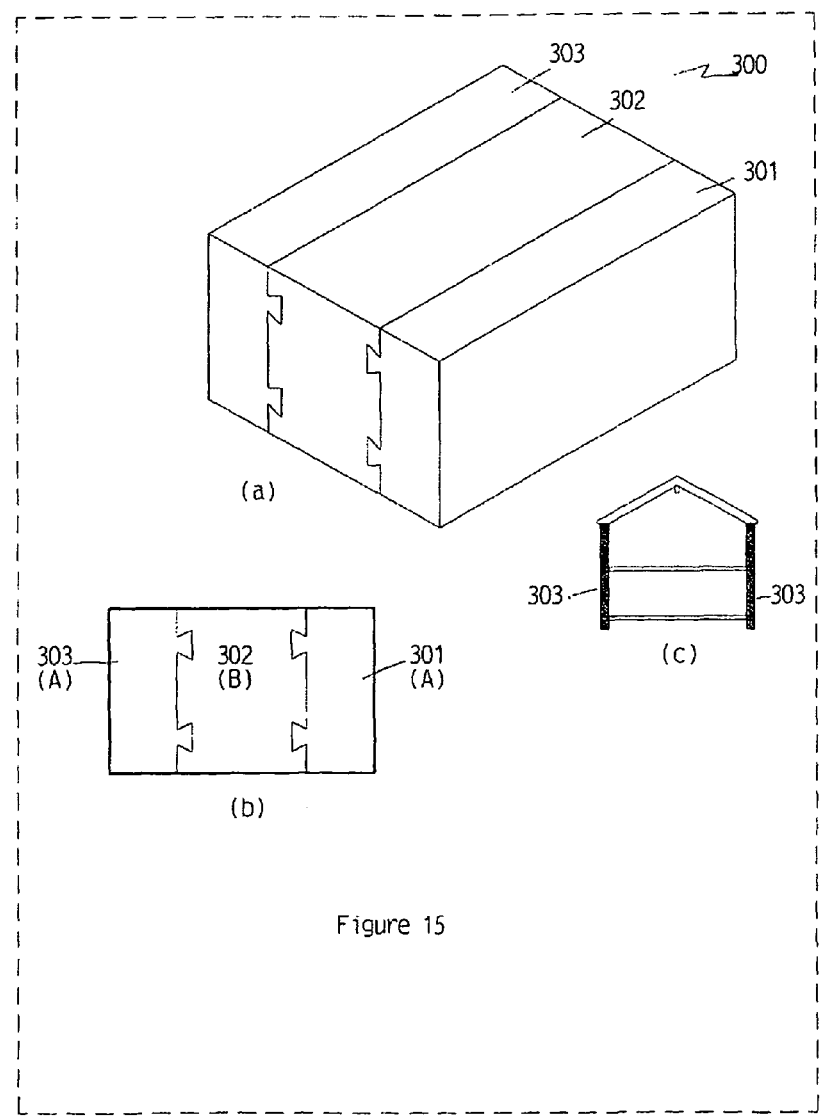

Referring now to FIGS. 15 (a), (b) and (c), an alternative embodiment, indicated generally by reference numeral 300 and which is similar to the unit 200 shown in FIGS. 14 (a), (b) and (c) will be described.

The unit 300 comprises three portions (301, 302 and 303) (as opposed to the two portions 201, 202 in unit 200). In unit 300, portion 301 comprises material A (same as already described in relation to unit 200), portion 302 comprises material B (as already described in relation to unit 200); and portion 303 which also comprises material A. Thus, in unit 300, material B which comprises expanded rigid polystyrene is sandwiched tween an interior portion 301 and an exterior portion 303, formed of geopolymeric cement of the present invention.

Referring now to FIGS. 16(a), (b), (c) and FIGS. 17(a), (b), (c) two further alternative embodiments will now be described.

Referring initially to FIGS. 16(a), (b) and (c) an alternative structural wall building unit, indicated generally by reference numeral 400, is shown.

The structural unit (block) 400 includes air gaps 405 which are positioned to maximize the distance travelled by heat when travelling through the block. Thus, for a structural wall building unit 400 which actually measures 350mm in thickness, the "effective thickness" (i.e. the thickness reflecting the distance which must be travelled by heat being transferred through the unit 400) is 940mm. Thus, the particular locations of the air gaps 405 in the structure have the advantage of increasing the "effective" thickness of the block by increasing the distance that heat has to travel in order to be transferred through the block unit 400. Thus, the air gaps 405 greatly increase the insulation value of the unit 400.

Referring now to FIGS. 17(a), (b) and (c), an alternative structural wall building unit, indicated generally by reference numeral 500, is shown. Unit 500 also includes air gaps and operates in the same way as unit 400. This is an improved version of the structural building unit 400 shown in FIGS. 16 (a), (b) and 9(c) which again includes air gaps 505 and works in the same way as described for unit 400. However, unit 500 also includes lugs 510 and lugs 512 for locating the blocks 500 securely in abutment with each other and for added stability. The lugs 510 can be engaged in the indents 511 of an adjacent unit 500. Likewise, lugs 512 can engage in slots (not shown) in a unit 500 which is located on top of a first unit 500 and so on, with adjacent units 500 engaging and interlocking together. The structural unit 500 is totally reversible and has an "effective" thickness of 1700mm even though the actual thickness is 366mm.

The U-valve for a block of actual thickness is 366mm is 0.16$m^2$K or better.

Thus, in summary, the novel features and advantages of the geopolymer structural building units of the present invention:
 1) Stone facing/veneer can be achieved
 2) Fibre composite wrapping
 3) Insulation value in one block/unit
 4) Structural solution in one block/unit
 5) Monolithic finish (same material used for walls, floors, roofs)
 6) Sustainability—reduced $CO_2$ production cf. to traditional cementitious products (10% $CO_2$ production) (less than 100kg $CO_2$ produced per ton of geopolymer binder rather than 1 ton of $CO_2$ per ton of (OPC) Ordinary Portland Cement)
 7) Ultra thin bed joints due to ultra thin bonding layer achieved by using geopolymer resin as adhesive;
 8) Use of silicone, silane, siloxane to waterproof units 9) Breathable structural building units which resist liquid water, but allow passage of water vapour, air etc.

It is to be understood that the invention is not limited to the specific details described herein which are given by way of example only and that various modifications and alterations are possible without departing from the scope of the invention as defined in the appended claims.

REFERENCES

Ref 1. Davidovits, J., "Global warming impacts on the cement and aggregate industries", World Resource review, 1994, Vol 6, p 263.
Ref 2: Hench L L, "Sol-Gel Silica. Properties, Processing and Technology Transfer", Noyes Publications, 1998.
Ref. 3: Geopolymer composites: A ceramics alternative to polymer matrices by Laurel M. Sheppard.
Ref. 4: J. Davidovits: in Proc. 'Geopolymer 2002', Melbourne, Australia, 2002, 1, pp 1-16.
Ref. 5: J. Davidovits; J. Therm. Anal., 1999, 37, pp 1633-1733.
Ref. 6: Sanjay Kumar, R. Kumar, T. C. Alex, A. Bandopadhyay and S. P. Mehrotra, Advances in Applied Ceramics, 106(3), 120-27.
Ref 7: http://kriven.mse.uiuc.eduirecent/geopolymers/papers/comrie-kriven%20paper.pdf.

The invention claimed is:

1. A geopolymeric cement formed from a precursor having a Si:Al atomic ratio of less than or equal to 1.3:1 and an alkali metal hydroxide and alkali silicate solution to form an alkaline alumino-silicate material, and wherein the precursor comprises weathered basaltic rock which is comprised of between 20% to 80% w/w of kaolinite with the remaining 80% to 20% w/w made up of smectites, iron oxides, gibbsite and olivine residual materials.

2. A geopolymer cement as claimed in claim 1 formed from a precursor having a Si:Al atomic ratio in the range of between 0.5:1 and 1.3:1 and forming an alkaline aluminosilicate geopolymer material.

3. A geopolymer cement as claimed in claim 1 wherein the precursor has a Si:Al atomic ratio in the range of between 1:1 and 1.3:1.

4. A geopoylmer cement as claimed in claim 1 wherein the precursor comprises Interbasaltic rock from Northern Ireland.

5. A geopolymeric cement as claimed in claim 1 wherein the precursor has a maximum particle size of less than 250 microns.

6. A geopolymeric cement as claimed in claim 1 wherein the smectites are selected from montmorillionite and vermiculite.

7. A geopolymeric cement as claimed in claim 1 wherein the geopolymeric cement is also formed using a calcium silicate material.

8. A geopolymeric cement as claimed in claim 7 wherein the calcium silicate material comprises Ground Granulated Blastfurnace Slag (GGBS) which provides a source of calcium which functions as an accelerator in the setting process.

9. A geopolymeric cement as claimed in claim 1 having a compressive strength in the range of between 95 to 120 $N/mm^2$.

10. A process for producing a geopolymeric cement from a precursor having a Si:Al atomic ratio of less than or equal to 1.3:1 and an alkali metal hydroxide and alkali silicate solution to form an alkaline alumino-silicate material, and wherein the precursor comprises weathered basaltic rock which is comprised of between 20% to 80% w/w of kaolinite with the remaining 80% to 20% w/w made up of smectites, iron oxides, gibbsite and olivine residual materials.

11. A process as claimed in claim 10 wherein the precursor comprises basaltic rock having high alumina content.

12. A process as claimed in claim 11 wherein the precursor comprises basaltic rock in which kaolinization is at an advanced stage, preferably lithomarge.

13. A process as claimed in claim 12 wherein the precursor is calcined at a temperature in the range of between 650° C. to 950° C.

14. A process as claimed in claim 12 wherein the weathered basaltic rock is composed of between 20% to 80% w/w of kaolinite with the remaining 80% to 20% w/w made up of smectites (e.g., montmorillionite and vermiculite), iron oxides, gibbsite and olivine residual materials.

15. A process as claimed in claim 12 wherein the ratio of precursor to alkali silicate is between 1:0.4 and 1:2 (w/w).

16. A process as claimed in claim 12 wherein a calcium silicate glass material is included in an amount of between 0 to 50% w/w of the geopolymeric cement.

17. A geopolymer cement as claimed in claim 3 wherein the Si:Al atomic ratio of the precursor is in the range between 1:1 and 1.2:1.

18. A geopolymer cement as claimed in claim 3 wherein the Si:Al atomic ratio of the precursor is in the range of 1.05:1 and 1.2:1.

19. A geopolymer cement as claimed in claim 4 wherein the precursor comprises Interbasaltic material known as Lithomarge found in Northern Ireland.

20. A geopolymeric cement as claimed in claim 5 wherein the precursor has a maximum particle size of less than 150 microns.

* * * * *